US010412139B2

(12) United States Patent
Rands

(10) Patent No.: US 10,412,139 B2
(45) Date of Patent: Sep. 10, 2019

(54) COMMUNICATION EVENT

(71) Applicant: Streamsure Solutions Limited, Winchester (GB)

(72) Inventor: James William Rands, Southend-on-Sea (GB)

(73) Assignee: Streamsure Solutions Limited, Winchester (GB)

(*) Notice: Subject to any disclaimer, the term of this patent is extended or adjusted under 35 U.S.C. 154(b) by 7 days.

(21) Appl. No.: 15/826,320

(22) Filed: Nov. 29, 2017

(65) Prior Publication Data
US 2018/0343294 A1 Nov. 29, 2018

(30) Foreign Application Priority Data

May 26, 2017 (GB) .................................. 1708473.2
May 26, 2017 (GB) .................................. 1708478.1

(51) Int. Cl.
*H04L 29/06* (2006.01)
*G06F 16/9535* (2019.01)
(Continued)

(52) U.S. Cl.
CPC ...... *H04L 65/602* (2013.01); *G06F 16/24575* (2019.01); *G06F 16/9535* (2019.01);
(Continued)

(58) Field of Classification Search
CPC ............. H04L 65/602; G06F 17/30528; G06F 17/30867
See application file for complete search history.

(56) References Cited

U.S. PATENT DOCUMENTS 9,361,521 B1* 6/2016 McLean .................. G06F 16/71
2004/0155963 A1* 8/2004 Kondo .................... G05B 15/02
348/180
(Continued)

FOREIGN PATENT DOCUMENTS

EP 0818926 A2 1/1998

OTHER PUBLICATIONS

United Kingdom Search and Examination Report for United Kingdom Patent Application GB1708473.2, dated Sep. 13, 2017.
(Continued)

*Primary Examiner* — El Hadji M Sall
(74) *Attorney, Agent, or Firm* — Dergosits & Noah LLP; Todd A. Noah

(57) ABSTRACT

In a communication event via a network between a requesting user, operating a first user device, and a responding user, operating a second user device, each of the user devices captures a stream of audio data, transmits the captured stream of audio data to the other user device via the network for receiving thereat, and outputs, to its user, the audio stream received from the other user device. A video exchange function is initially suppressed for the communication event for both of the user devices. The first user device transmits to the second user device a request to stop suppressing video. If the responding user does not accept the request, the video exchange function continues to be suppressed for both of the user devices. If the responding user accepts the request, the video exchange function stops being suppressed for both of the user devices.

25 Claims, 22 Drawing Sheets

(51) Int. Cl.
    G06F 16/2457    (2019.01)
    H04M 1/725     (2006.01)
    H04N 7/14      (2006.01)
    H04N 21/431    (2011.01)
    H04N 21/4545   (2011.01)
    G06Q 30/02     (2012.01)
    H04N 21/4788   (2011.01)
    G06F 3/041     (2006.01)
    G06F 3/0484    (2013.01)
    G06F 3/0486    (2013.01)

(52) U.S. Cl.
    CPC ........ *G06Q 30/02* (2013.01); *H04M 1/72522* (2013.01); *H04N 7/147* (2013.01); *H04N 21/4318* (2013.01); *H04N 21/45455* (2013.01); *H04N 21/4788* (2013.01); *G06F 3/041* (2013.01); *G06F 3/0486* (2013.01); *G06F 3/04847* (2013.01); *H04M 2250/52* (2013.01); *H04N 2007/145* (2013.01)

(56) References Cited

U.S. PATENT DOCUMENTS

| | | |
|---|---|---|
| 2009/0049484 A1 | 2/2009 | Conter |
| 2011/0249073 A1 | 10/2011 | Cranfill et al. |
| 2011/0252340 A1 | 10/2011 | Thomas |
| 2012/0142316 A1 | 6/2012 | Park |
| 2015/0172336 A1 | 6/2015 | Guignon et al. |
| 2015/0229882 A1 | 8/2015 | Liu |
| 2015/0365627 A1 | 12/2015 | Deng et al. |
| 2018/0232592 A1* | 8/2018 | Stewart ............ G08B 13/19606 |

OTHER PUBLICATIONS

United Kingdom Search and Examination Report for United Kingdom Patent Application GB1720692.1, dated Jan. 30, 2018.
United Kingdom Intention to Grant for United Kingdom Patent Application GB1708473.2, dated May 21, 2018.
United Kingdom Intention to Grant for United Kingdom Patent Application GB1720692.1, dated May 21, 2018.
International Search Report and Written Opinion for corresponding PCT Appln. No. PCT/EP2018/059403, dated Jun. 8, 2018.

* cited by examiner

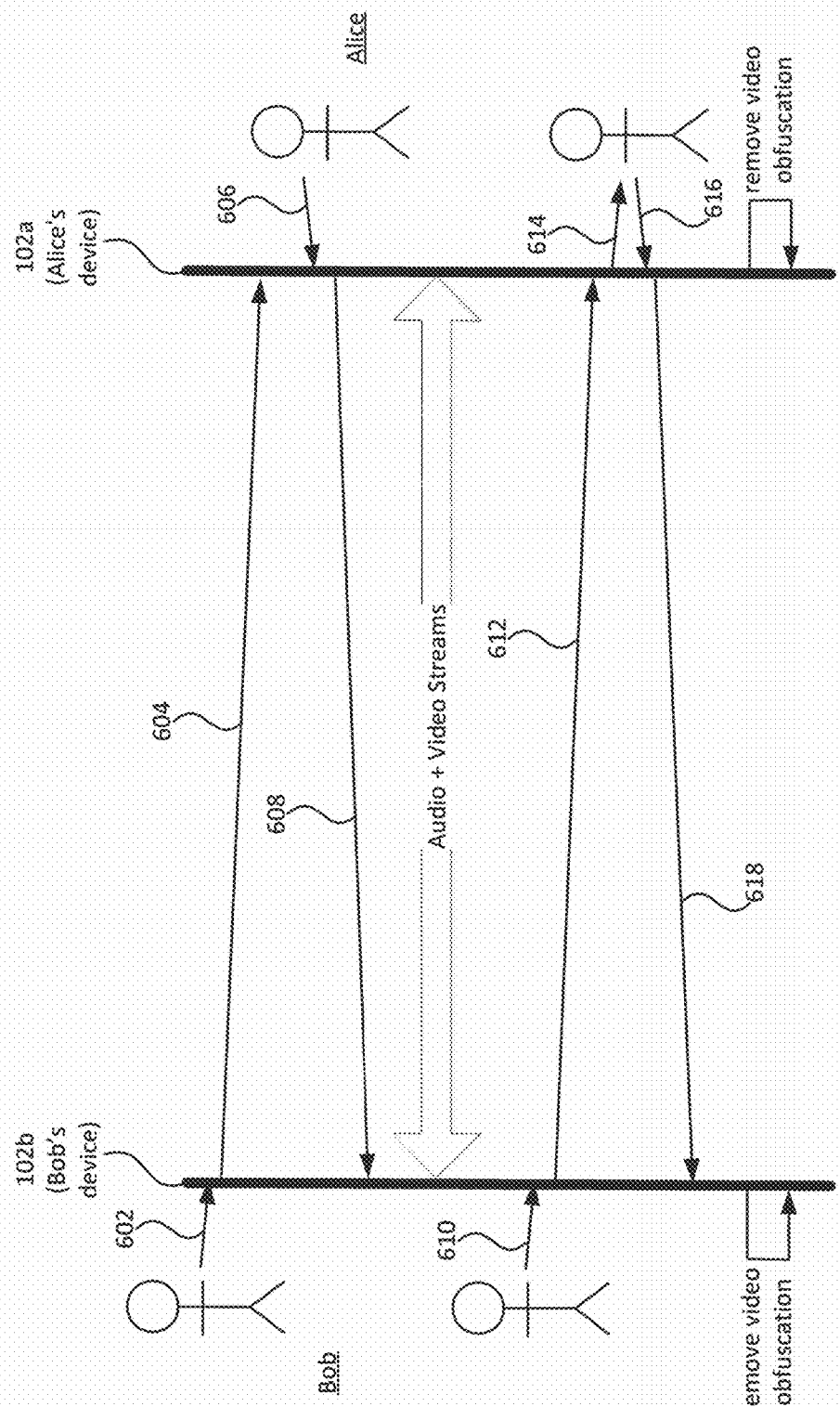

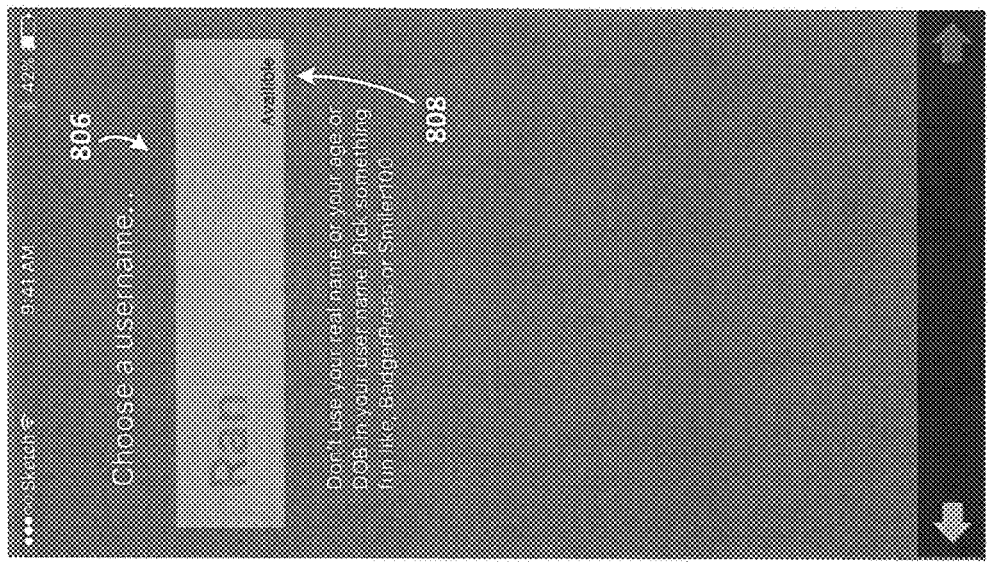
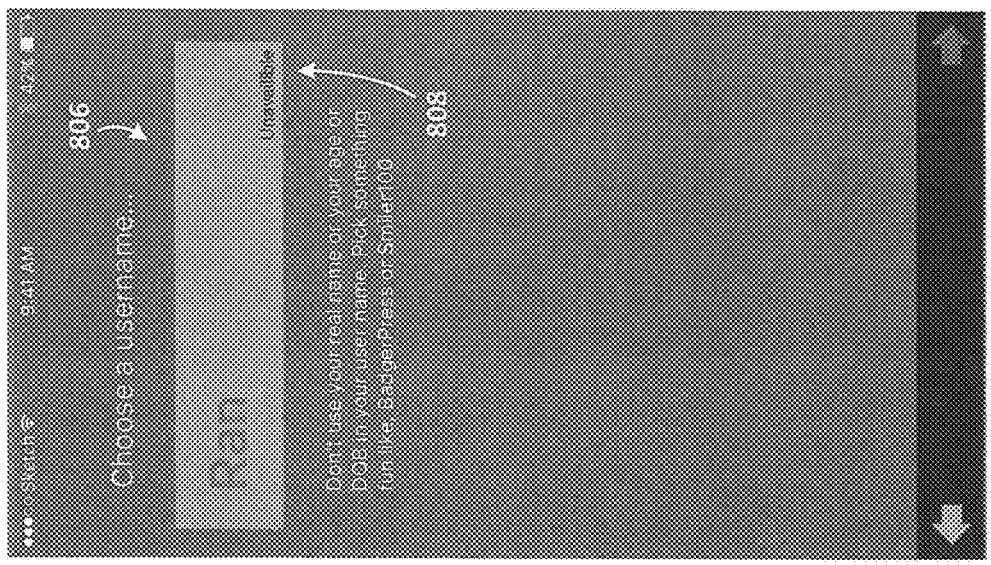

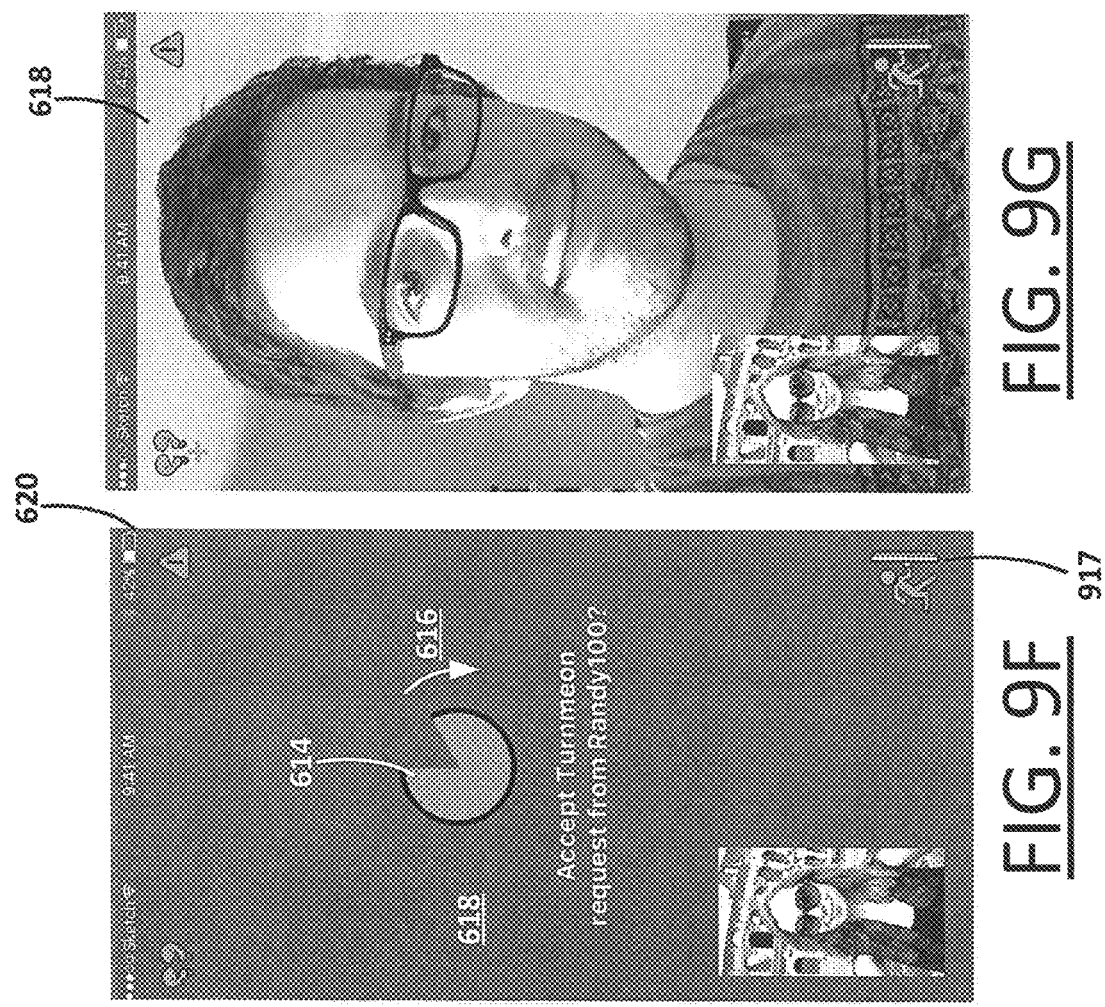

1. Start of process

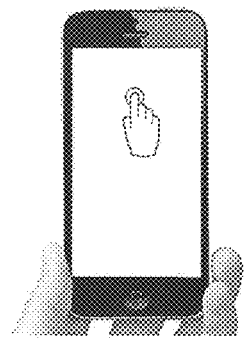

Press, touch and hold, tap or double tap, multi-touch on n number of fingers

FIG. 11A

2. Start of interaction

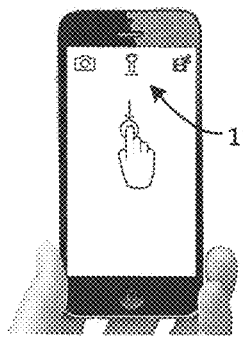

Whilst 1 is active user can pull/drag in any direction to show various call to actions that interface with the device hardware or other application features including but not limited to; toggling lens apertures, toggling camera lamp where available, capturing a still image, toggling recording modes, toggling mute audio or triggering application menu systems.

3. Priming a call to action

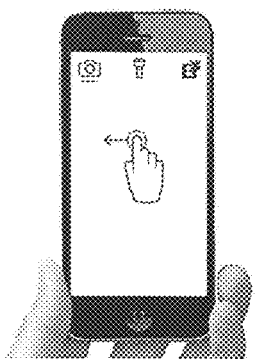

Whilst 1/2) are still active user can move in a direction in this case left to prime a call to action and highlight its potential activity

FIG. 11C

4. Priming a call to action

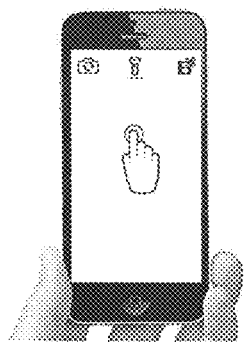

Whilst 1/2) are still active user can move in a direction in this can center to prime a call to action and highlight its potential activity.

FIG. 11D

5. Priming a call to action

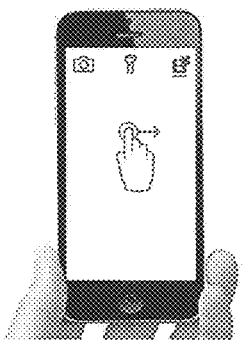

Whilst 1/2) are still active user can move in a direction in this can right to prime a call to action and highlight its potential activity.

FIG. 11E

6. Resetting process before call to action

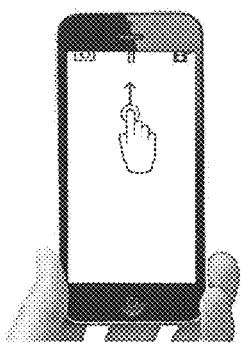

Whilst 1/2/3/4/5 are active a user can reverse the initial pull/drag direction essentially resetting the visibility of any call to action icons and un-priming any selected call to actions.

FIG. 11F

7. Invoking a call to action

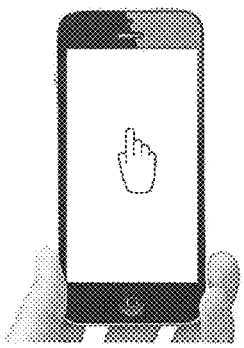

When n number of fingers are removed from the screen a selected call to action trigger is activated with call to action icons being removed from the available screen real estate until 1) is invoked again.

FIG. 11G

8. Conversation mode

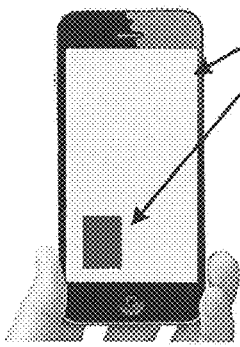

- Receiving video object is full screen but not limited to position, size or shape
- Preview video object not limited to position, size or shape

FIG. 11H

9. Invoke a share video request

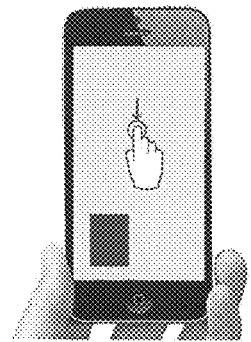

Sender of request can pulldown to a certain point and release to send a request to the receiver to initiate removal of video obfuscation; with audio available to both parties at all times, Internet connections are maintained

FIG. 11I

10. Receiver interactions

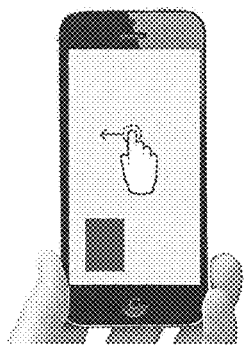

Within an allotted time frame, receiver swipes left to cancel/ignore the request to share video, which results in keeping all video obfuscation enabled for both parties and notifies the initializer of the request the receivers response status message.

FIG. 11J

11. Receiver interactions

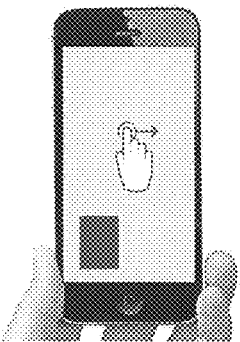

Within an allotted time frame, receiver swipes right to agree the request to share video, which results in removing all video obfuscation (for both parties) and notifies the initializer of the request.

FIG. 11K

12. Camera Interactions

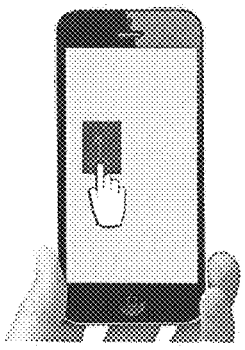

Dragging your own preview up switches to the back camera when obfuscation is removed as long as the new preview position is greater than more than half the full screen height.

FIG. 11L

13. Camera light action

Where applicable Press, touch and hold, tap or double tap, multi-touch of n number of fingers on the preview object will toggle the camera light.

COMMUNICATION EVENT

CLAIM OF PRIORITY

This application claims priority to United Kingdom Patent Application No. GB 1708473.2, filed on May 26, 2017, the entire contents of which are incorporated herein by reference.

This application claims priority to United Kingdom Patent Application No. GB 17084780.1, filed on May 26, 2017, the entire contents of which are incorporated herein by reference.

FIELD OF THE INVENTION

Aspects of this disclosure relate to a communication event between two users via a network.

BACKGROUND

Modern user devices provide an increasingly wide array of options for users to communicate with each other, as more and more communication applications (apps) are developed for such devices. This applies in particular to mobile devices, such as smartphones, as the range of mobile apps developed for popular mobile platforms has grown significantly in recent years. Such applications include, for example, basic messaging applications that allow users to conduct conversations in real-time via text exchange, multimedia messaging applications that extend this to the exchange of media content, such as images emojis/emoticons, gifs, short audio/video clips etc.; VoIP (Voice over IP) applications that allow real-time audio and video calls to be conducted over (primarily) the Internet; social media apps; and dating apps, among others.

Dating apps, and in particular mobile dating apps, have become significantly more popular in recent years. Whilst so-called "online dating" has been around for some time, historically this was seen something of a niche activity. However, though newer dating apps, such as Tinder, online dating is becoming increasingly mainstream. A key driver in this has been the availability of dating services on smartphones. Not only does this provide users with significantly more flexibility in terms of where and when they can choose to engage in online dating activity, but certain mobile dating apps have also been extremely effective when it comes to harnessing the functionality of modern smartphones—in particular, their location awareness and advanced touchscreen functions (one example being Tinder with its location-based matching and "swipe right/swipe left" interface).

BRIEF SUMMARY OF THE INVENTION

A first aspect of the present invention is directed to a method of effecting a communication event via a network between a requesting user, operating a first user device, and a responding user, operating a second user device, the method comprising: initiating the communication event, in which each of the user devices captures a stream of audio data, transmits the captured stream of audio data to the other user device via the network for receiving thereat, and outputs, to its user, the audio stream received from the other user device; wherein a video exchange function is initially suppressed for the communication event for both of the user devices, by first and second video suppression components associated with the first and second user devices respectively, and the first user device transmits to the second user device, in response to a user input from the requesting user, a request to stop suppressing video for the communication event; and wherein if the responding user does not accept the request, both of the video suppression components continue suppressing the video exchange function for both of the user devices, wherein if the responding user accepts the request, both of the video suppression components stop suppressing the video exchange function for both of the user devices in response, wherein each of the user devices implements the video exchange function by capturing a stream of video data, transmitting the captured stream of video data to the other user device via the network for receiving thereat, and displaying, to its user, the stream of video data received from the other user device.

In other words, suppression of the video exchange function as between the requesting user and the responding user is only terminated (i.e. video is only "unlocked") via mutual agreement of both users and, moreover, if and when it is unlocked, it is unlocked for both of the users, i.e. in an "all or nothing" manner. This provides security for the users as both of the users know that all video will remain suppressed until both users are ready to stop suppressing it, and either of the users can feel comfortable in requesting unsuppressed video, when ready, as he/she knows that his/her own video will only be unsuppressed if and when the other user's video is also unsuppressed.

The preferred embodiments of the invention that are described below incorporate this functionality into a dating app, such as a mobile dating app. Respective instances of the dating app are executed on each of the user devices, which may be smartphones. The security provided by the invention is particularly important in the context of a dating app, as in that context it is likely the users have never met before and may therefore not be comfortable with sharing (full) video immediately.

"Suppressed" in the context of the invention can mean that the videos streams are blocked altogether, or it can mean that effects are applied to the video streams to obscure their visual content, and in particular to conceal any faces therein. For the latter, video streams are still exchanged when the video exchange function is suppressed, however "full" video without such obfuscation (in which the faces are no longer concealed) requires mutual agreement. In this respect, the "video exchange function" encompasses the full chain of signal processing from the point at which a video stream is captured at one of the user devices to the point at which it is displayed at the other user device. The video suppression can be effected at any point or points in that signal processing chain, at either user device or even at some intermediate network device, such as a server or other intermediate node of the network. A "video suppression component associated with a user device" means a functional component that blocks or obscures the video stream captured at that device (or prevents its capture altogether). The video suppression component need not be implemented at the user device it is associated with necessarily, e.g. it could also be implemented at the other device to block or obscure the stream after it has been received, or elsewhere in the network.

Accordingly, in embodiments of the invention, the user devices may also capture, transmit and display the video streams when the video exchange function is suppressed, and each of the video suppression components may suppress the video exchange function for its associated user device by processing the stream of video data captured or received at that user device to obscure its visual content.

On the one hand, this still provides the aforementioned benefits in terms of user security though the obfuscation of the video until both users agree to end this, but on the other hand does so whilst providing a more engaging conversation experience as there is still an engaging visual component of the communication event before then.

For example, the visual content may be obscured by processing the stream of video data such that a partially transparent overlay is rendered on the stream of video data when displayed. As another example, the visual content may be obscured by applying a face-concealing filter to the stream of video data. For example an "Instagram" style filter that is distorts the user's face enough to disguise the user's identity, or which replaces the user's face with an artificial face that tracks the user's facial movements.

Alternatively, the video exchange function may be suppressed for each of the user devices by preventing the capturing, receiving or displaying of video data at that user device, whereby no video data of the communication event is displayed at either of the user devices when the video exchange function is suppressed.

In embodiments, the user input that instigates the request may be a gesture on a touchscreen of the first user device. For example, the gesture may be a drag and release gesture (which may be vertically downwards, but could be in any other direction depending on the implementation). This is somewhat similar to what is known as an "elastic refresh", however rather than refreshing content, here the gesture is being used to trigger a request to stop suppressing video.

As the user performs the drag and release gesture by dragging along the touchscreen of the first user device, in response a level of obfuscation applied to the video stream received at the first user device from the second user device may be reduced before the request has been accepted, whereby the visual content remains obscured but with a lower level of obfuscation, For example, where the visual content is obfuscated by a partially transparent overlay, as the user performs the drag and release gesture by dragging along the touchscreen of the first user device, in response the partially transparent overlay rendered on the stream of video data captured at the second user device may be moved, in a direction of the dragging, from an initial position in which the visual content of the stream is fully obscured to a new position such that a limited area of that visual content is no longer obscured.

This has the benefit of providing intuitive visual feedback as the gesture is performed: moving the overlay to reveal a small amount of unobscured video as the user performs the gesture indicates that the gesture the user is currently performing relates to the removal of the overlay and the consequent de-obfuscation of the video. That is, the behaviour of the UI as the user performs the gesture is closely coupled to the nature of the request that will be sent when the user completes it, as performing the gesture removes the overlay from a limited area of the video and completing the gesture sends a request to the other user for the overlay to be removed entirely.

The same visual feedback benefits apply more generally whenever the level of obfuscation is reduced slightly in other ways as the user performs the gesture, as the behaviour of the UI conveys the purpose of the gesture.

For example, as the user performs the drag and release gesture by dragging along the touchscreen of the first user device, in response an opacity of the overlay may be reduced from an initial non-zero value to a new non-zero value, thereby reducing the level of obfuscation.

Upon completion of the gesture, the partially transparent overlay may return to the initial position or opacity to reverse the increase.

The limited area of unobscured visual content may have a size that increases as the user drags further along the touchscreen up to a maximum size. The opacity may decreases as the user performs the gesture down to a minimum opacity.

Where, the visual content is obscured by applying a face-concealing filter to the stream of video data, the level of obfuscation may be reduced by adapting at least one parameter of the face-concealing filter, to reduce an extent to which a face in the visual content is concealed.

The responding user may accept the request by making a first gesture on a touchscreen of the second user device, and reject the request by making a second gesture on the touchscreen of the second user device.

The first and second gestures may both be instigated by a drag action on the touchscreen of the second device in an initial direction, wherein the first gesture is completed by a subsequent drag and release action in one of the directions perpendicular to the initial direction, and the second gesture is completed by a subsequent drag and release action in the other direction perpendicular to the initial direction.

As another example, the first gesture may be a swipe in a first direction and the second gesture may be a swipe in an opposing direction.

Each of the users may have an associated identifier held in a database, wherein the identifiers are paired with each other in the database allow the communication event between the users to be initiated. The user identifiers in the database may be paired with each other using a pairing algorithm (matching algorithm). That is, such that users can only initiate communication events with each other once they have been paired by the pairing algorithm.

In response to the identifiers being paired, each of the paired identifiers may be rendered available to the user device operated by the other user.

Each of the identifiers may be a user identifier or a network address, for example.

The user identifiers in the database may be paired with each other, by the pairing algorithm, based on one or more of the following pairing criteria: age, gender, location, friendship preferences, dating preferences, interests, and sexual orientation.

The pairing algorithm may be a randomized pairing algorithm.

For each of the users, at least one engagement score for that user may be held in the database in association with that user's identifier.

The user identifiers in the database may be paired with each other, by the pairing algorithm, based on their associated engagement scores.

The communication event may be conducted via respective applications executed on the user devices, wherein for each of the users, at least one engagement score for that user is held in a database in association an identifier associated with that user, which is increased as that user engages with the application executed on his or her user device.

In response to a user's engagement score reaching an engagement threshold, a function of the application may be unlocked for that user in response.

The application function may be a discovery function which, when unlocked for a user, allows that user to obtain information held in the database about other users for whom the discovery function has also been unlocked.

The communication event between the requesting and responding users may be initiated by one of those users after the discovery function has been unlocked for both of those users, using information about the other user obtained from the database via the discovery function by the user initiating the communication event.

If the responding user accepts the request, the responding user's engagement score may be incremented in response (thus affecting future pairings for that user in the case that users are paired based on their engagement scores).

The responding user's engagement score may be incremented by an amount which is determined in dependence on an amount of time taken by the responding user to accept the request.

The requesting user's engagement score may be incremented in response to the responding user accepting the request or in response to the requesting user initiating the request (thus affecting future pairings for that user in the case that users are paired based on their engagement scores).

The number of requests to stop suppressing video that the requesting user can instigate to the responding user may be limited by a request threshold.

If the request is not accepted by the responding user within a time limit, it may be that it cannot be accepted thereafter. That is, the request may "expire" at the end of the time interval.

The second user device may display a notification of the request to the responding user, and the notification may be updated dynamically to convey an amount of time remaining to accept the request.

A corresponding notification may be displayed at the first user device to the requesting user, to indicate to the requesting user the amount of time remaining.

With expiring requests, the engagement score may be incremented as a function of the amount of time remaining to accept the request when the request is accepted. That is, the amount of time left until the request expires.

The video exchange function may be suppressed for each of the user devices by preventing the capturing, receiving or displaying of video data at that user device, whereby no video data of the communication event is displayed at either of the user devices when the video exchange function is suppressed. That is, to block video for both users.

At each of the user devices, an avatar image associated with the other user may be displayed when the video exchange function is suppressed, which is replaced by the other user's video stream when the suppression stops.

The first video suppression component associated with the first user device may be implemented at the second user device, to obscure or block the stream of video data received from the first user device, and the second video suppression component associated with the second user device may be implemented at the first user device, to obscure or block the stream of video data received from the second user device.

Alternatively, the first and second video suppression components may be implemented at the first and second user devices respectively.

Where the request is instigated with a gesture, and the same gesture is performed on the touchscreen after the request has been accepted, in response the first user device may display at least one selectable option relating to the communication event. That is, the gesture may be "repurposed" once the request has been accepted, to render options available for the communication event. These are preferably options that are rendered relevant by the removal of the video obfuscation. For example, the at least one option may be selectable to control the video exchange function. For example, the at least one option is selectable to control the capturing of the stream of video data at the first user device.

A second aspect of the invention is directed to a method of effecting a communication event via a network between a requesting user, operating a first user device, and a responding user, operating a second user device, the method comprising: initiating the communication event, in which each of the user devices captures a stream of audio data, transmits the captured stream of audio data to the other user device via the network for receiving thereat, and outputs, to its user, the audio stream received from the other user device; wherein a video exchange function is initially suppressed for the communication event for at least the second user device, by a video suppression component associated with the second user device, and the first user device transmits to the second user device, in response to a user input from the requesting user during the communication event, a request to stop suppressing video for the communication event; and wherein if the responding user does not accept the request, the video suppression component continues suppressing the video exchange function for at least the second user device, wherein if the responding user accepts the request, the video suppression component stops suppressing the video exchange function for the second user device in response, wherein the user devices implement the video exchange function by: at least the second user device capturing a stream of video data and transmitting the captured stream of video data to the first user device via the network for receiving thereat, and the first device displaying, to its user, the stream of video data received from the second user device.

In embodiments, the user input may be a gesture on a touchscreen of the first user device.

The gesture may be a drag and release gesture.

The second user device also captures and transmits the video stream when the video exchange function is suppressed, and the video suppression component may suppress the video exchange function for the second user device by processing the stream of video data captured at the second user device to obscure its visual content.

As the user performs the drag and release gesture by dragging along the touchscreen of the first user device, a level of obfuscation applied to the video stream received at the first user device from the second user device may be reduced in response, before the request has been accepted, whereby the visual content remains obscured but with a lower level of obfuscation.

The visual content may be obscured by processing the stream of video data such that a partially transparent overlay is rendered on the stream of video data when displayed.

In embodiments of the second aspect, any feature of the first aspect or any embodiment thereof can be implemented.

It is noted that, whilst in the first aspect of the invention, mutual agreement is needed before video suppression is terminated, and is only ever terminated for both users simultaneously, the second aspect of the invention can also be applied with one-way agreements. In such a scenario, both Alice and Bob's video would be obscured or blocked initially. When (say) Bob sends a request to Alice and Alice accepts it, suppression of Alice's video stops so that Bob can now see Alice. However, Bob's video remains blocked or obscured, until Alice requests to end this and Bob accepts. Although less preferred in some contexts, this may nonetheless be viable in other contexts, and still provides security as each user retains control over when their own video is unlocked.

Other aspects of this disclosure relates to computer-implemented control of a display to render a user interface.

A user interface (UI/UX) refers to a mechanism by which a user and a computer can interact with one another. A graphical user interface (GUI) may be rendered on a display of a user device, such as a smartphone, and a user can interact with the GUI using an input device of the user device, such as a touchscreen. With modern UI's on touchscreen devices in particular, gesture control may be used as a means of interacting with the GUI. One example is a so-called "pull down to refresh" gesture that is found in many apps, whereby the user performs a drag and release gesture, by dragging a finger (e.g. thumb) along a touchscreen display and releasing it from the touchscreen to refresh content currently shown on the display, for example to refresh a web-page, check for new email or other messages, refresh a social media feed etc.

A third aspect of the invention is directed to a computer-implemented method of rendering a user interface, the method comprising the following steps: at a user interface controller, receiving visual content to be displayed on a display of a user device, wherein the user interface controller generates obfuscation data for obscuring the visual content and controls the display to render a user interface on which the visual content is obscured according to the obfuscation data; and transmitting, from the user device to a remote device, a request to stop obscuring the visual content, wherein the request is transmitted in response to a drag gesture detected at the user device; wherein as the drag gesture is performed, the user interface controller responds by modifying the obfuscation data to reduce a level of obfuscation applied to the visual content before the request has been accepted, whereby the visual content remains obscured but with a lower level of obfuscation, wherein if the request is subsequently accepted at the remote device, in response the user interface controller controls the display to stop obscuring the visual content, thereby rendering it fully visible on the display.

This has the benefit of providing intuitive visual feedback as the gesture is performed: reducing the level of obfuscation slightly, as the user performs the gesture, indicates that the gesture the user is currently performing relates to the de-obfuscation of the video. That is, the behaviour of the UI as the user performs the gesture is closely coupled to the nature of the request that will be sent when the user completes it, as performing the gesture slightly de-obfuscates the visual content and completing the gesture sends a request to the other user for the obfuscation to be removed altogether.

The gesture can be the same as or similar to that normally performed to refresh content, but rather than refreshing content, the action this triggers is the sending of a request to remove the video obfuscation.

In embodiments, the user interface may obscure the visual content by rendering an overlay of the user interface, the overlay obscuring the visual content, wherein the user interface controller reduces the level of obfuscation by modifying or moving the overlay, and stops obscuring the visual content by removing the overlay.

The user interface controller may reduce the level of obfuscation by moving the overlay in a direction associated with the drag gesture such that a limited area of the visual content is no longer obscured by the overlay, and is thus visible on the display unobscured before the request has been accepted.

Alternatively or in addition, the user interface controller may reduce the level of obfuscation by reducing an opacity of the overlay from an initial non-zero value to a lower non-zero value. The initial value may be such that the overlay is partially transparent (so that the obscured content is always slightly visible).

The user interface controller may obscure the visual content by applying a face-concealing filter to the visual content, wherein the user interface controller reduces the level of obfuscation by adapting the face-concealing filter.

The request may be transmitted to the remote device for accepting or rejecting by a user of the remote device.

For example, the request may be transmitted during a communication event between a user of the user device and the user of the remote device.

Alternatively, the request may be accepted or rejected automatically at the remote device using information contained in the request.

The information may comprise an identifier of the visual content.

The information may comprise an identifier of the user device or an identifier of a user of the user device (that is, one or both of those identifiers).

The remote device may use the identifiers to determine whether the user device or user is authorized to access the identified content.

The remote device may transmit at least one message back to the user device requesting further information, wherein the requested information is used by the remote device to determine whether to accept or reject the request.

The requested information may comprise payment information.

The visual content may be visual content of a stream of video data received at the user interface controller.

The visual content may be received at the user interface controller from the remote device, or it may be received from a separate device.

The user interface controller may be embodied in the user device, or it could be implemented at a different device which controls the display of the user device remotely.

If the same drag gesture is performed again after the request has been accepted so that the video is no longer obscured, an action relating to the visual content may be triggered in response or selectable option is displayed in response, which is selectable to trigger an action relating to the visual content. That is, a different action may be mapped to that gesture, once the video is no longer obscured.

A fourth aspect of the invention is directed to a computer-implemented method of capturing image data at a user device, the method comprising implementing, by at least one processor of the user device, the following steps: activating an image capture device of the user device; receiving at the processor, from the active image capture device, a stream of image data captured by the image capture device; controlling a display of the user device to render the captured stream of image data as a video image on the display, whereby the video image shows a current field of view of the image capture device, wherein the video image is moveable using a user input device of the user device; and in response to a user using the user input device to move the video image showing the current field of view, from an initial position on the display to a new position on the display, triggering at least one image capture function at the user device.

This also provides an intuitive user interface mechanism, whereby the user can manipulate the locally-captured video image itself to trigger the image capture function at the user device.

The at least one triggered image capture function may comprise an activation function which activates a second image capture device of the user device when triggered in response to the user moving the video image from the initial position to the new position. The image capture device may be deactivated in response to the user moving the video image from the initial position to the new position. That is, moving the video image may switch from the image capture device to the second image capture device.

The at least one processor may replace the video image with a video image derived from a stream of image data captured by the second image capture device once active.

The at least one processor may transmit, from the user device via a network to a remote device, as an outgoing data stream, a version of the image data captured by the image capture device, and the at least one processor replaces the image data in the outgoing data stream with image data captured by the second image capture device once active.

An incoming stream of image data may be received at the user device from the remote device via the network and rendered on the display as an incoming video image simultaneously with the moveable video image.

One of the image capture devices may be a front-facing image capture device, and the other may be a rear-facing image capture device.

The at least one image capture function comprises an illumination function which activates at least one illumination device of the user device when triggered to illuminate the field of view of the image capture device.

The at least one image capture function may be triggered in response to the video image being moved at least a predetermined distance.

A fifth aspect of the invention is directed to a computer-implemented method of rendering a user interface, the method comprising the following steps: at a user interface controller, receiving visual content to be displayed on a display of a user device, wherein the user interface controller controls the display to render a user interface having a moveable overlay that obscures the visual content; and transmitting, from the user device to a remote device, a request to remove the overlay, wherein the request is transmitted in response to a drag gesture detected at the user device; wherein as the drag gesture is performed, the user interface controller responds by controlling the display so as to move the overlay in a direction associated with the drag gesture such that a limited area of the visual content is no longer obscured by the overlay, and is thus visible on the display unobscured before the request has been accepted, wherein if the request is subsequently accepted at the remote device, the overlay is removed by the user interface controller in response, thereby rendering the visual content fully visible on the display.

A sixth aspect of the invention is directed to a computer-implemented method of rendering a user interface, the method comprising the following steps: at a user interface controller, receiving visual content to be displayed on a display of a user device, wherein the user interface controller controls the display to render a user interface having an overlay that obscures the visual content; and transmitting, from the user device to a remote device, a request to remove the overlay, wherein the request is transmitted in response to a drag gesture detected at the user device; wherein as the drag gesture is performed, the user interface controller responds by controlling the display so as to reduce an opacity of the overlay from an initial non-zero value to a new non-zero value, wherein if the request is subsequently accepted at the remote device, the overlay is removed by the user interface controller in response, thereby rendering the visual content fully visible on the display.

A seventh aspect of the invention is directed to a computer-implemented method of rendering a user interface, the method comprising the following steps: at a user interface controller, receiving visual content to be displayed on a display of a user device, wherein the user interface controller generates obfuscation data for obscuring the visual content and controls the display to render a user interface on which the visual content is obscured according to the obfuscation data; and transmitting, from the user device to a remote device, a request to stop obscuring the visual content, wherein the request is transmitted in response to a drag gesture detected at the user device; wherein if the request is subsequently accepted at the remote device, in response the user interface controller controls the display to stop obscuring the visual content, thereby rendering it fully visible on the display.

An eighth aspect of the invention is directed to a computer program product comprising executable instructions stored on a computer-readable storage medium, which are configured, when executed, to carry out the method of any of the first to seventh aspects or any embodiment thereof.

A ninth aspect of the invention is directed to a computer system comprising: at least one processor; and electronic storage coupled to the at least one processor configured to hold executable instructions, which are configured, when executed on the at least one processor, to carry out the method of any of the first to seventh aspects or any embodiment thereof.

The computer system may be a distributed computer system, or it can be localized, e.g. embodied in a user device.

BRIEF DESCRIPTION OF THE FIGURES

For a better understanding of the present invention, and to show how embodiments of the same may be carried into effect, reference is made by way of example only to the following figures in which:

FIG. 6 shows an example messaging exchange for the method of FIG. 4;

FIG. 7 shows an example of an initial user interface (UI) configuration for an application (app);

FIGS. 8A-8J show examples of the app UI at different points during registration;

FIGS. 9A-9G show examples of the app UI at different points in use, before and during a communication event with another user;

FIGS. 11A-11M illustrate various gestures which the app responds to and the app's responses to those gestures.

DETAILED DESCRIPTION

Figure 1:
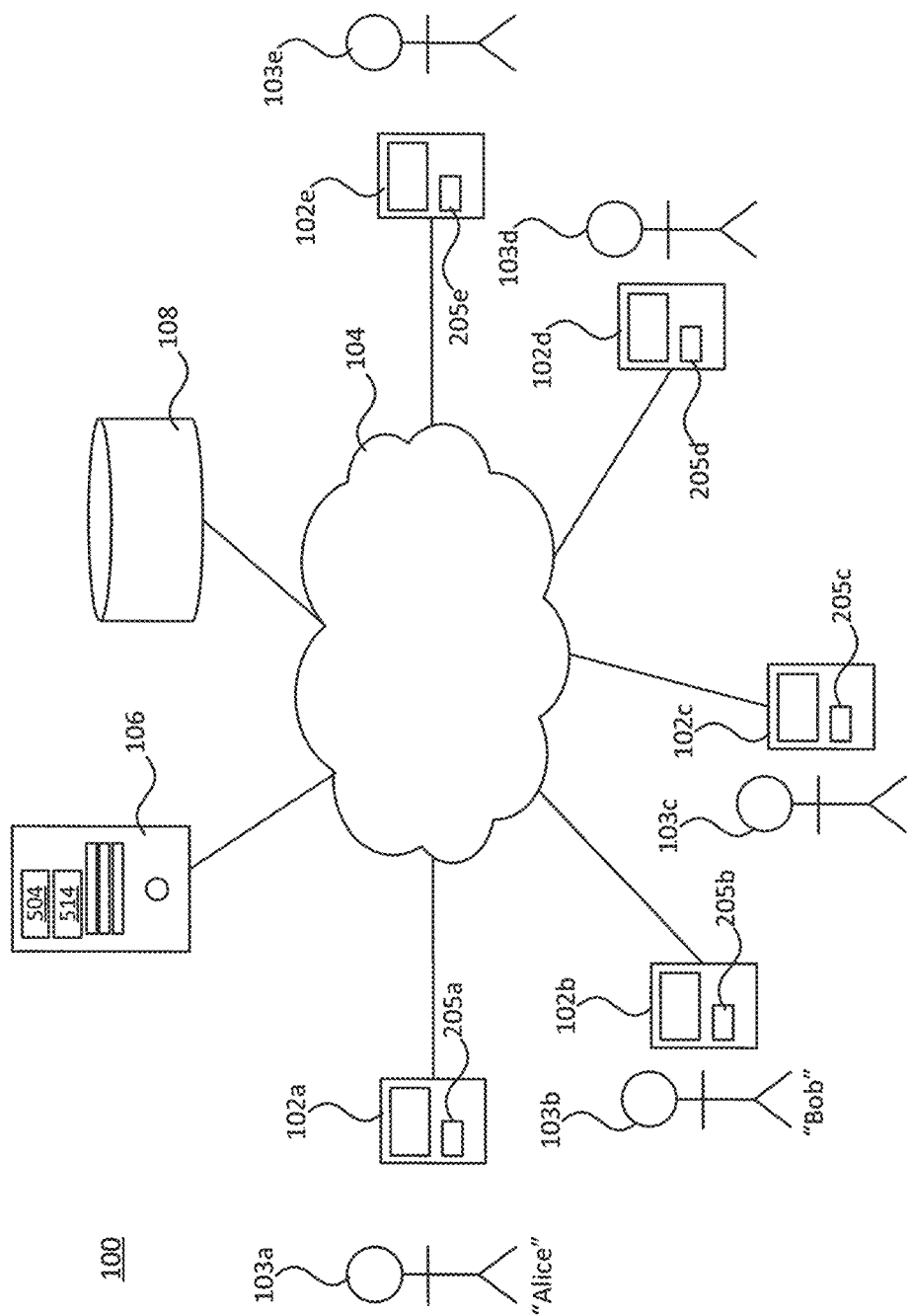
FIG. 1 shows a schematic block diagram of an online-dating system.

The described embodiments of the present invention provide a dating app with real-time communication functions, typically as a precursor to real-life meet-ups should the users feel that way inclined.

Users can engage in two-way live video conversations with random users, where the live video is masked and obscured with full audio being heard at all times where users are connected to each other. A user pulls down to request sharing of (unobscured) video content with the other user and the user receiving the request has to agree or not, within a time limit, by swiping down then left or right accordingly. That is, people meet other people randomly on the fly, but have their identity protected until a mutual bond of trust has been formed vocally. Either or both of the users may receive "points" for their actions, particularly if the request is accepted, to boost their respective "engagement scores" (see below).

Users of the dating application are paired together ("matched"), by a pairing algorithm, and once matched either of those users can initiate a real-time communication event with the other in accordance with the invention. That is, the real-time communication functions of the dating app are "unlocked" only once users have been matched in that a user can only initiate such a communication event, via the dating app, with another user he/she has been matched with.

The pairing algorithm can for example be executed at a back-end computer system, and operates as a pairing system to pair users based on one or more pairing criteria, such as location, age, gender, sexual orientation, common interests, user-expressed dating preferences or any combination thereof. In the described embodiments, the pairing algorithm is randomized, in the sense that user pairings are driven at least in part by random or pseudorandom inputs to the pairing algorithm. Accordingly, in this context, it is any pairing criteria together with the randomized inputs that determine which users are able to communicate with each other via the dating app. User pairings can be determined entirely autonomously by the pairing algorithm, or the pairing algorithm may autonomously determine potential pairings (that is, candidate matches) which the users are then free to accept or reject (for example, the algorithm may autonomously suggest a pairing of users, but it is only when both users accept this suggested pairing that they are actually paired and thus able to engage in real-time communications via the dating app).

Dating apps do exist today that unlock communication functions only when users are paired, however this tends to be limited to text-based messaging. For example, the Tinder app autonomously suggests potential matches to users, but it is only when both users "like" each other that they are actually matched, and thus able to communicate with each other via text. Real-time audio/videos streaming is not normally used as a basis for communication between matched users within dating apps.

FIG. 1 shows a schematic block diagram of a data exchange system 100, which is an online-dating system, in which a plurality of user devices 102a-102e are shown connected to a network 104. The network 104 is a packet based computer network such as the Internet. Also shown connected to the network 104 are: a back-end system 106 comprising at least one computing device, such as a server; and a database 108, which can be implemented in any suitable manner (localized or distributed). Each of the user devices 102a-102e is a user-operated computing device—operated by users 103a-103e respectively—such as a smartphone, tablet, smartwatch or other smart device, laptop or desktop computer etc. Preferably at least some of the user devices are mobile devices. Although only five user devices are shown in FIG. 1, this is purely exemplary and the data exchange system 100 may have any number of connected user devices.

The users 102a-e, who are users of the dating app, can engage in a real-time conversation with each other via the network 104 (communication event) once they have been matched together by the pairing algorithm, which is labelled 504 in the figures and is shown executed at the back-end system 106 in FIG. 1. When the conversation is first initiated, audio data can be freely exchanged between those users via the network 104, as respective audio streams, so they can hear each other speak. However, the exchange of video data between the users is suppressed—either by obscuring the video, or blocking it altogether—until both users mutually agree to lift this restriction within the conversation, at which point video stops being suppressed for both users. In other words, either video is suppressed in both directions for both of the users (when at least one of the users has not agreed to lift this restriction), or it is suppressed in neither direction for neither of the users (once both have agreed to lift this restriction).

In this context, there therefore are two levels of "unlocking", in that 1) two users must be matched with each other before real-time communication via the dating app is unlocked for that pair of users, and 2) both of those users must then subsequently agree to unlock (full) real-time video-based communication if and when they are both ready.

Real-time in this context means there is only a short delay between one user speaking and the other user hearing/seeing that user speak, for example about two seconds or less.

Figure 2:
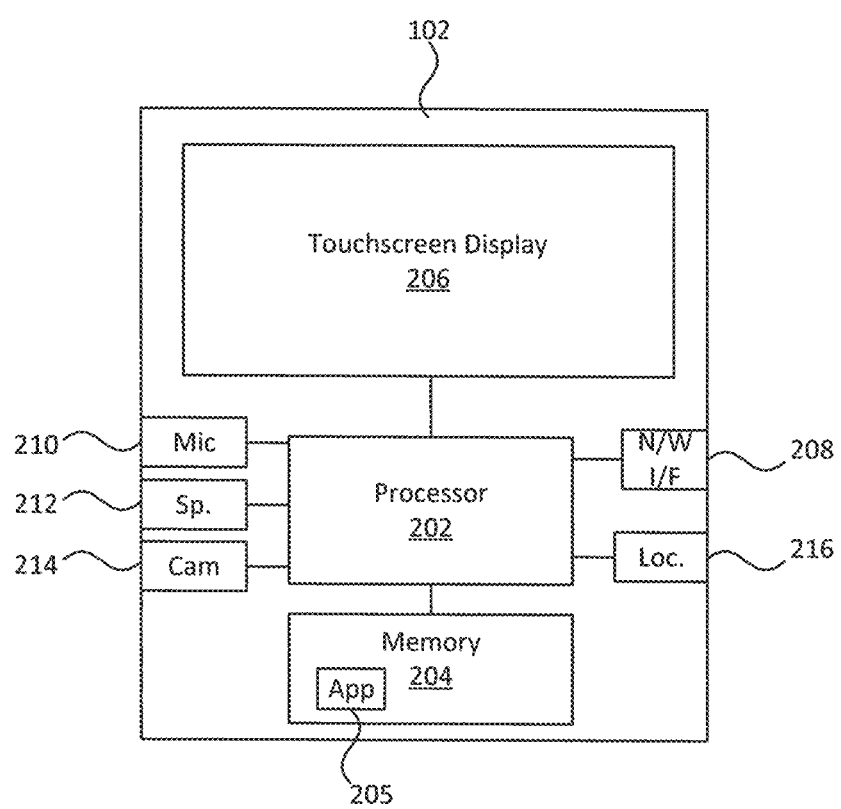
FIG. 2 shows a schematic block diagram of a user device.

FIG. 2 shows a block diagram of a user device 102, such as a mobile device. As will be appreciated, FIG. 2 is highly schematic and all description herein pertaining to user device 102 applies equally to each of the user devices 102a-e shown in FIG. 1 even if they differ in the specifics of their configurations.

The user device 102 is shown to comprise at least one processor 202, such as a CPU (Central Processing Unit) or set of CPUs/CPU cores, for example in a multi-core processor. Shown connected to the processor 202 are the following devices: electronic storage 204 comprising one or more electronic storage devices, such as magnetic storage, solid-state storage, optical storage or any combination thereof; a display 206; a network interface 208, via which the user device can connect to the network 104; at least one audio capture device 210 for capturing a user's speech, such as a microphone or microphone array; at least one audio output device 212 for outputting (playing-out) received audio, such as a loudspeaker or set of loudspeakers, headset etc.; at least one image capture device 214 (camera); and at least one location sensing device 216 (location sensor). The aforementioned devices can be integrated in the user device, peripheral components (wired and/or wireless), or a mixture of both.

In the described examples, the display 206 comprises a touchscreen and thus functions as both an input and an output device of the user device 102. It is noted, however, that all description herein relating to the touchscreen applied equally to other forms of input device where applicable.

Shown stored in the memory 205 is a version of the dating app 205 for execution on the processor 202. In order to execute the dating app 205, the processor 202 fetches instructions of the dating app 205 and carries out operations according to those instructions to implement the functionality of the dating app 205.

Returning briefly to FIG. 1, the user devices 102a-e are shown executing respective instances of the dating app 205, denoted 205a-e respectively. Instances of the dating app 205 executed on different devices can communicate with each other via the network 104 in order to carry out the functions described herein, and in particular to provide a two-way exchange of audio and video data streams via the network 104.

Preferably the user device 102 has at least a front-facing camera, located so that it can capture images of the user's face. This allows face-to-face conversations to be conducted with other users via the network 104. The user device may also have a rear-facing camera, and the user may be able to switch between the two during the conversation.

Figure 3A:
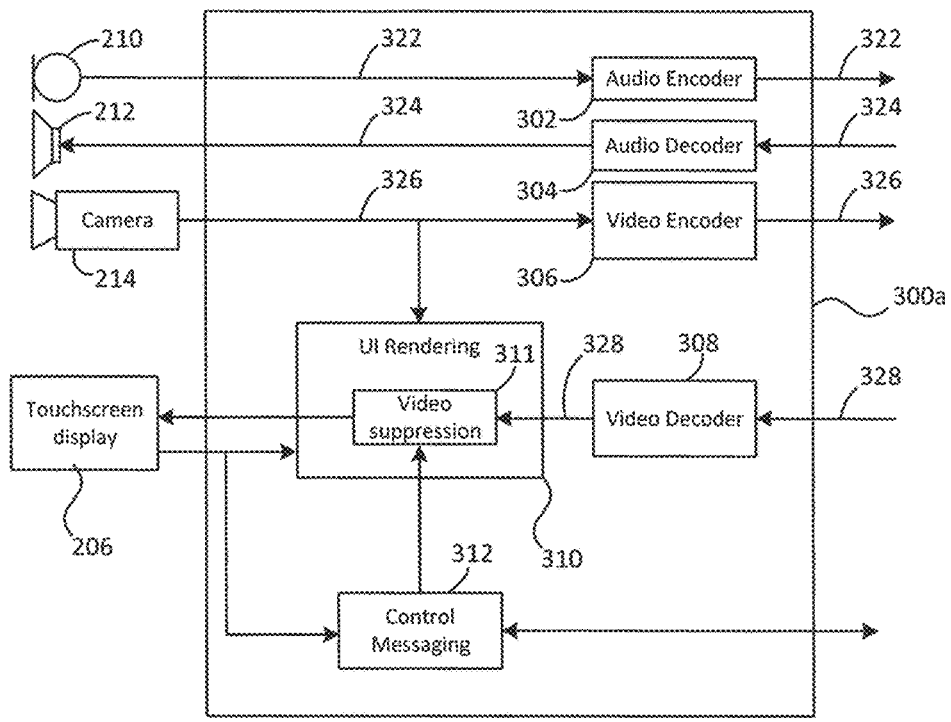
FIG. 3A shows a functional block diagram for a media exchange system in a first embodiment of the invention.

FIG. 3A shows a functional block diagram for a media exchange system 300a according to a first embodiment of the invention. Various functional components of the media exchange system 300a are shown, namely an audio encoder 302 having an input connected to the audio capture device 210, an audio decoder 304 having an output connected to the audio output device 212, a video encoder 306 having an input connected to the image capture device 214 for receiving video data to be encoded, a video decoder 308, a user interface (UI) rendering component 310, and a control messaging component 312.

The media exchange system 300a is implemented at each of the user devices 102a-102e to allow a two way exchange of audio and video data streams between pairs of those devices. Video data means image data embodying a sequence of images to be displayed in quick succession to create the impression of motion.

Although not shown in FIG. 3A, the audio encoder 302 and decoder 304 are connected to the audio capture device 210 and audio output device 212 respectively via an analogue to digital converter (ADC) and digital to analogue converter (DAC) respectively. The audio encoder 302 receives a stream of captured audio data 322 (audio stream) to be encoded (that is, an audio signal captured by the audio capture device 210 and converted to digital form by the DAC) and encodes (compresses) it. The encoded audio stream 322 is transmitted via the network 104 to another user device in real-time. The audio decoder 324 receives an incoming stream of real-time audio data 324 via the network 104 from the other user device. This is received in an encoded (compressed) form, and the audio decoder 304 decodes it and supplies it to the audio output device 212 (via the DAC) so that it is outputted to the user.

The video encoder 306 receives a stream of video data 322 (video stream) captured by the image capture device 214 and encodes (compresses) it. The encoded video stream 322 is transmitted via the network 104 to the other user device in real-time. The video decoder 308 receives an incoming stream of real-time video data 328 via the network 104 from the other user device. This is received in an encoded (compressed) form, and the video decoder 308 decodes it for displaying on the display 206.

Encoding in this context means compression, whereby the bit rate of the audio/video stream is reduced for transmission. This can be lossless compression, whereby no information is lost, lossy compression, whereby information is selectively discarded, or a combination of both. Decoding means decompression, which is essentially the reverse of this process to recover the original audible or visual content of stream in question, or at least an approximation of the original stream content where lossy compression has been used. Audio/video encoding and decoding are well known in the art so this will not be described in any more detail.

Although not shown in FIG. 3A, in order to transmit the outgoing audio and video streams 322, 326 over the packet based-network 104, they are packetized for transmission. Similarly, the incoming streams 324, 328 are received as packets and re-assembled for decoding. Again, this is well known in the art so is not described in any more detail.

The UI rendering component 310 has an output connected to the display 206 for rendering a UI on the display 206, and the UI rendering component 310 and control messaging component 312 also have inputs connected to the touch-screen of the display 206 for receiving user inputs from the user of the user device 102. The UI rendering component 310 also has a first video input connected to an output of the video decoder 308 for receiving decoded video data and a second video input connected to the image capture device 214 for receiving locally captured video data, so that both of those video data can be rendered as part of the UI thereby displaying them to the user of the user device 102.

The control messaging component 312 also has an output connected to a control input of the UI rendering component 310 for controlling the operation of the UI rendering component 310, and in particular to a video suppression component 311 of the UI rendering component 310 for controlling the operation of the video suppression component 311.

In this manner, when two user devices are communicating, the image capture device 214 and video encoder 306 at each of those devices cooperate with the video decoder 306, UI rendering component 310 and display 206 at the other device to provide a video exchange function for exchanging video data between the users via the network 104. That is, for exchanging visual information between those users in real-time.

The video suppression component 311 selectively suppresses the video exchange function provided by the cooperating media exchange systems at the communicating user devices. In the first embodiment of FIG. 3A, it does so by selectively obscuring the visual content of the incoming video stream 328 before it is displayed.

Figure 3B:
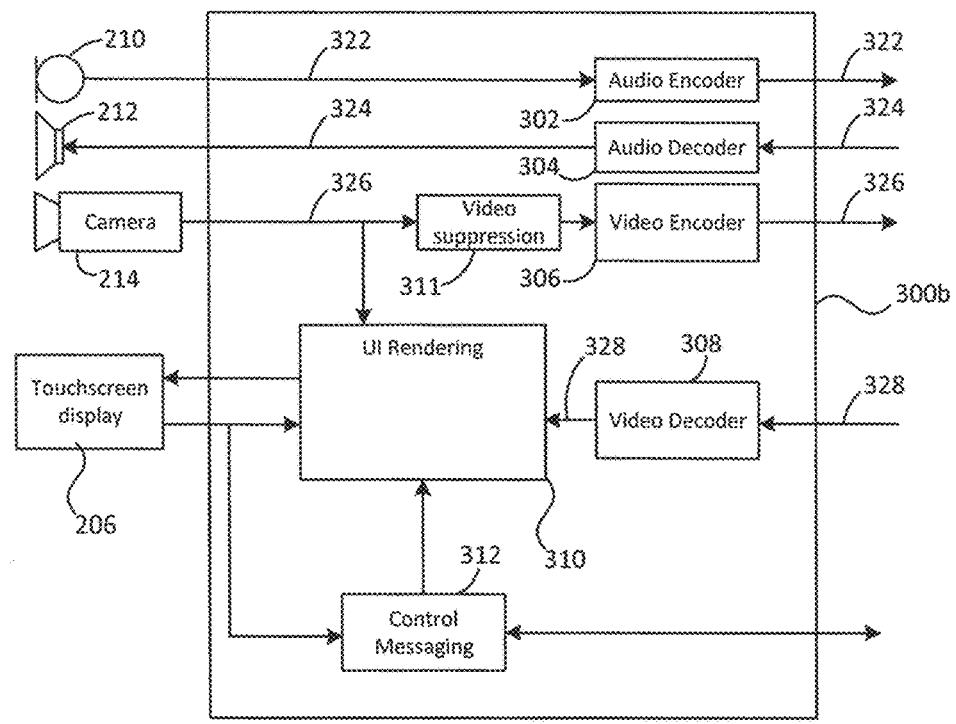
FIG. 3B shows a functional block diagram for a media exchange system in a second embodiment of the invention.

FIG. 3B shows a functional block diagram for a variant of the media exchange system, denoted 300b, according to a second embodiment of the invention. The second media exchange system is the same as that of the first embodiment, apart from the differences set out below. Like reference numerals are used to denote like components, and all description pertaining to the system 300a of FIG. 3A applies equally to the system 300b of FIG. 3B.

In the media exchange system 300b of FIG. 3B, instead of obscuring the incoming video stream 328, the video processing module 311 selectively obscures the visual content of outgoing video stream 326 before transmission.

The media exchange systems 300a, 300b represent functionality that is implemented by the dating app 205 when executed on the processor 202 of the user device 102, in the first and second embodiments respectively, where each of the aforementioned functional components of those systems represents a different part of this functionality.

Each of the user devices 102a-e is thus configured to implement such a media exchange system 300a/300b, by way of the dating app instance 205a-e executed on that device.

Figure 4:
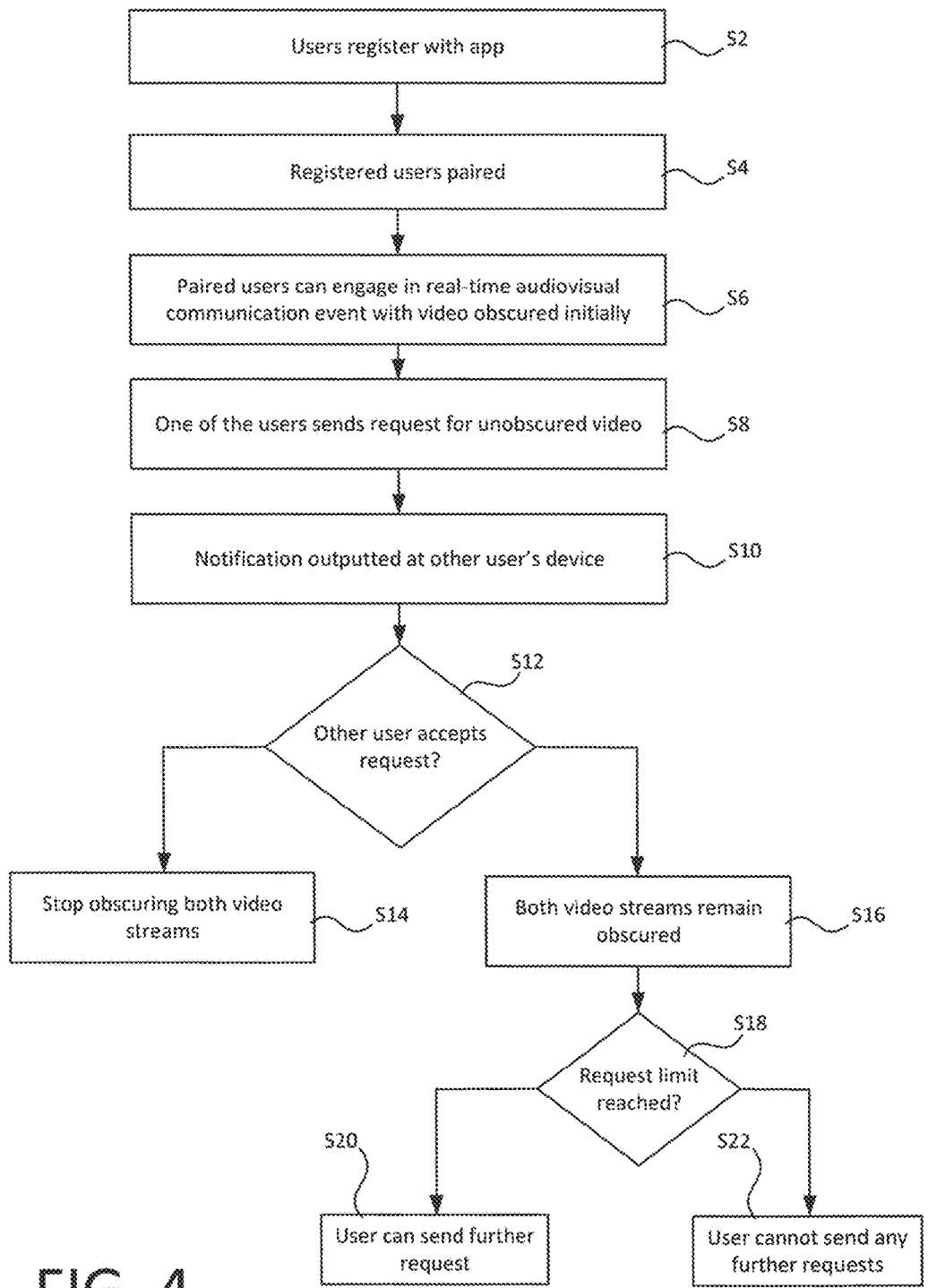
FIG. 4 shows a flowchart for a method of effecting a communication event between two users via a network.

FIG. 4 shows a flow chart for a method effecting a real-time conversations between users of the dating app.

In order to use the dating app, users install the app on their user devices 102a-e (unless it is installed already) and also register with the back-end system 106 (S2). During the registration process, at least one identifier associated with a registering user is stored in the database 108 to enable the registering user to be identified within the system 100 as a user of the dating app. The identifier can for example be a user identifier, such as a username or handle created specifically for the dating app or a pre-existing user identifier, such as an email address or other user identifier for some pre-existing user account, such as a social media account or multi-purpose account used to access a range of services. Alternatively, the identifier can be a network address associated with the user, such as a network address (e.g. IP address) of his user device that allows the user device to be contacted via the network 104. That is, a device identifier can act as an identifier of its user. Registration could for example involve the user creating a profile for the dating app, where the user also provides information about him/herself that is stored along with the associated identifier(s) as part of the profile in the database 108. The identifier or identifiers held in the database 108 for a particular user constitute an identity of that user within the online-dating system 100, and which is used by the user to access the functions of the dating app.

Figures 7, 8A, 8B:
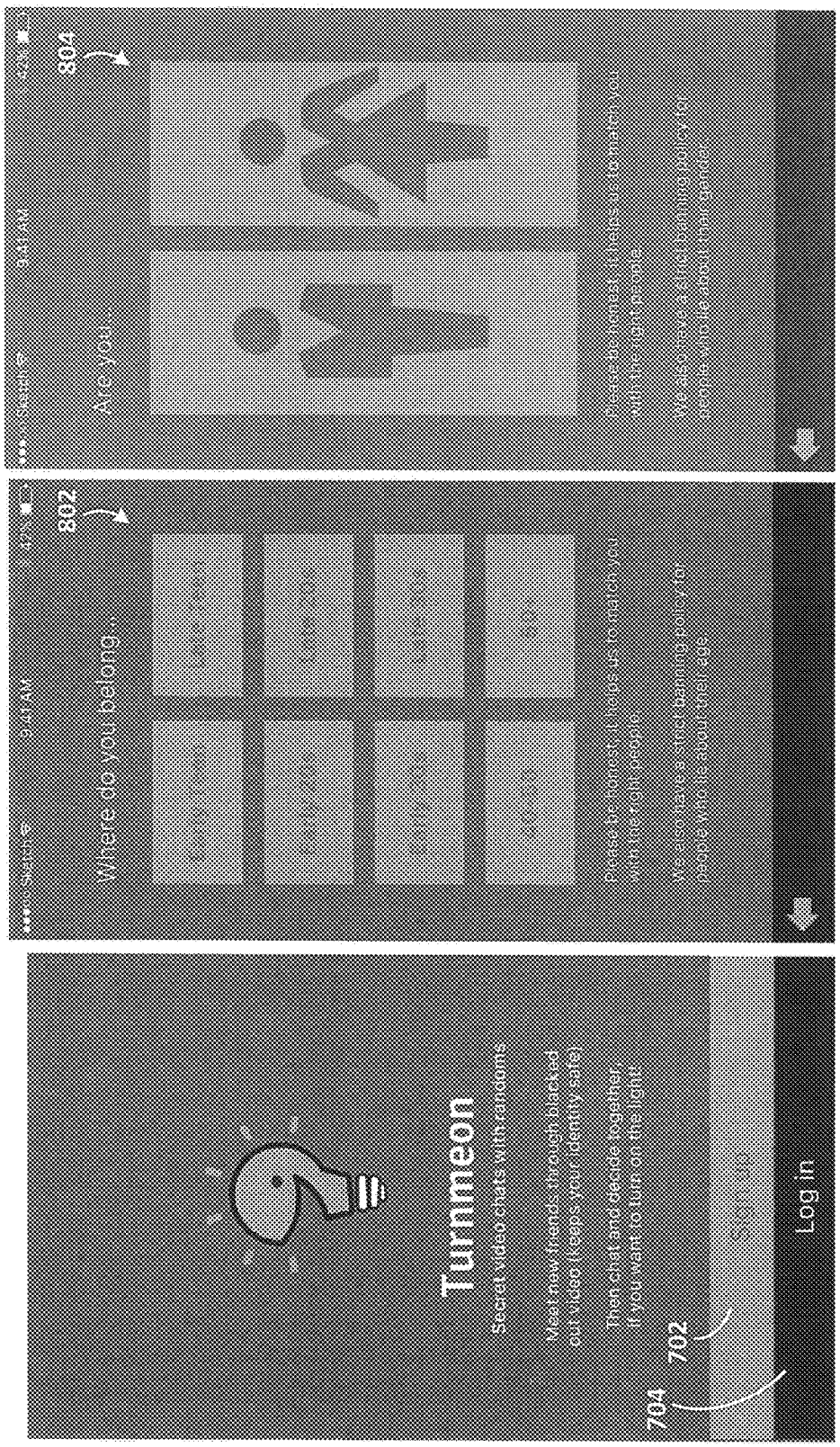
Figure 8D:
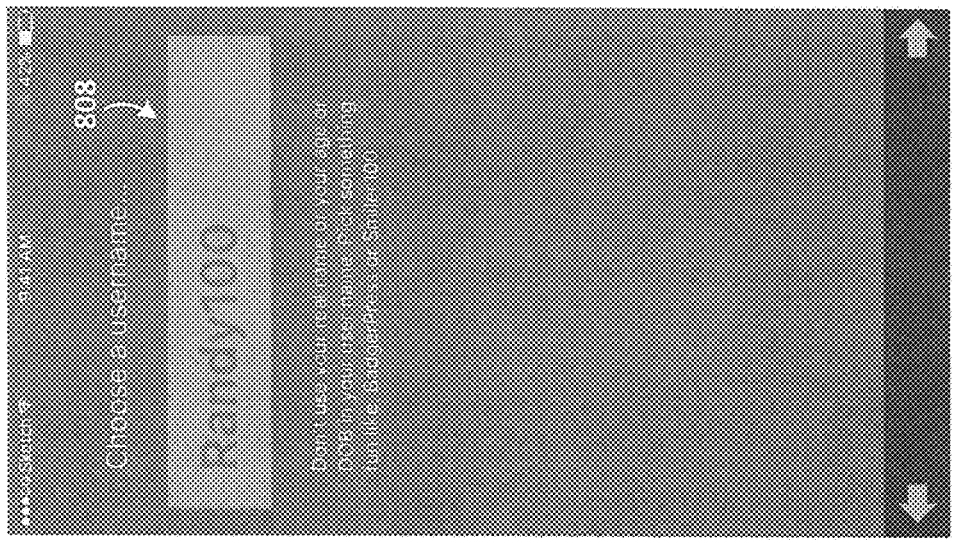
Figure 8C:
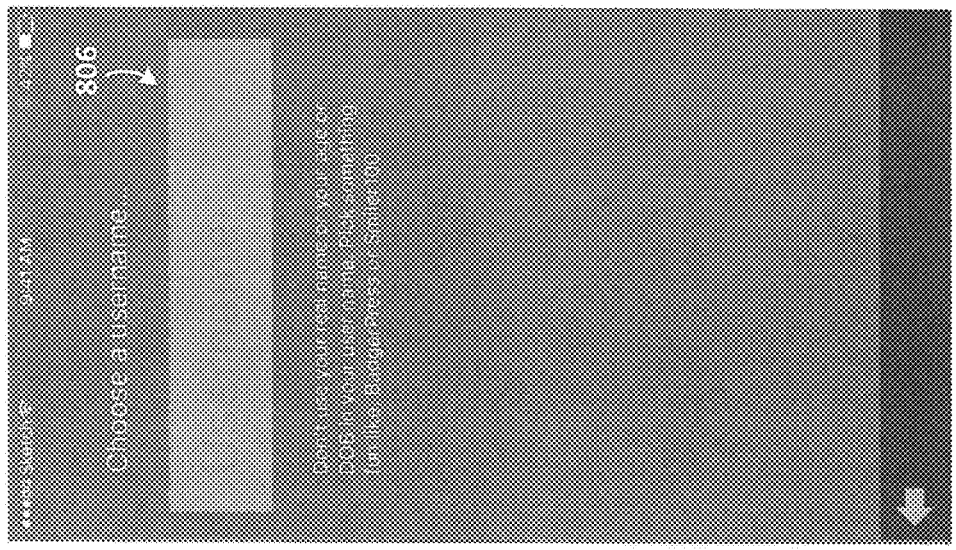
Figures 8G, 8H, 8I:
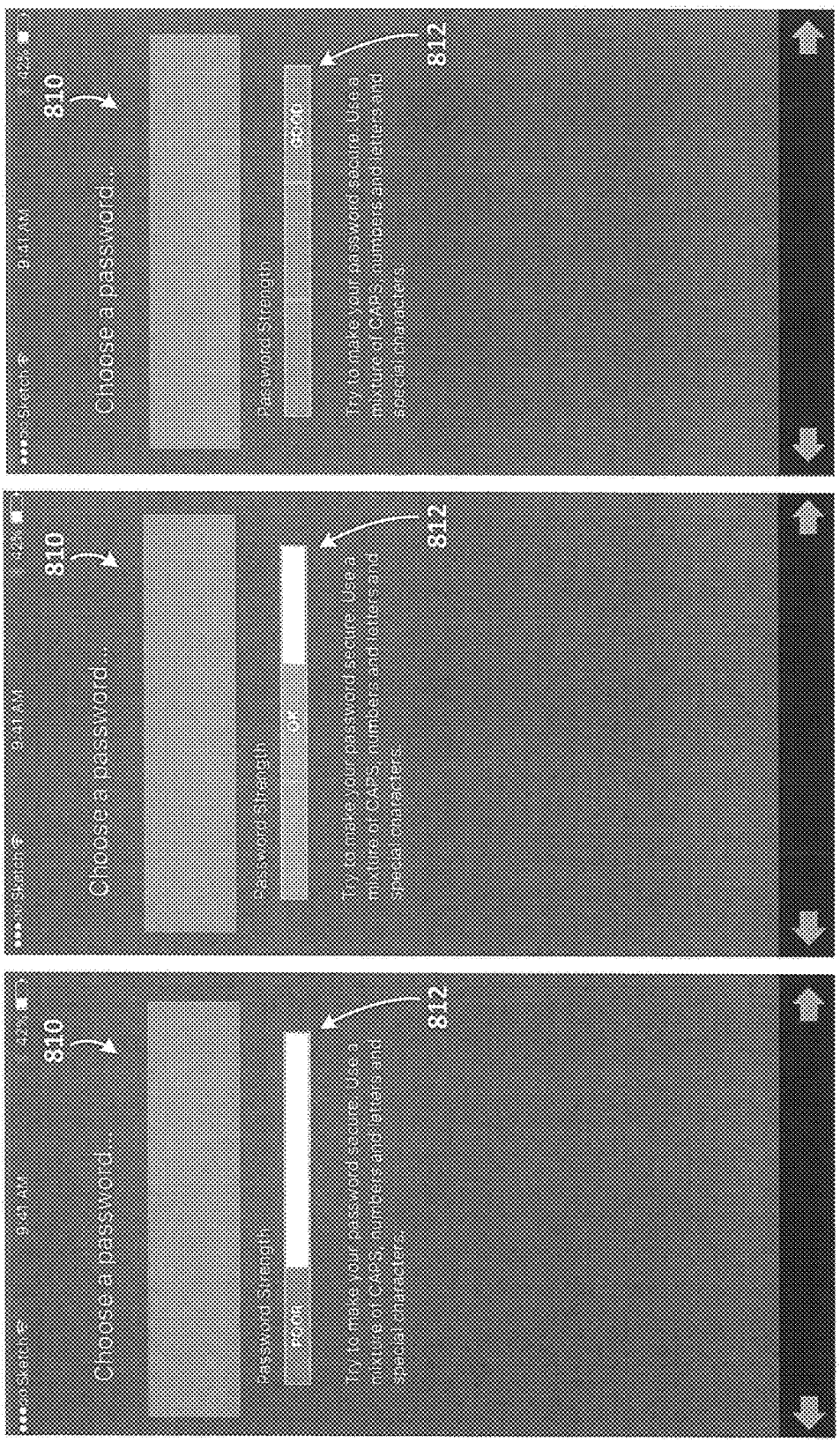
Figure 8J:
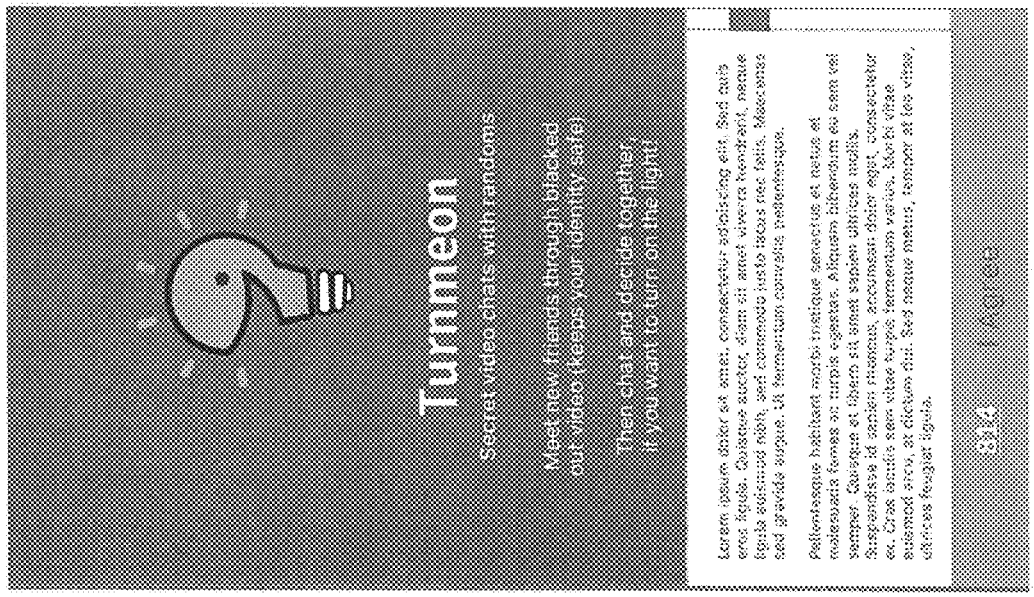

FIG. 7 shows one example of an initial configuration of the UI that might be presented when a user first opens the app. Selectable options to either sign-up, i.e. instigate the registration process (702), or to log-in if the user is already registered (704) are displayed, along with a basic explanation of the app's features. FIGS. 8A-K show the UI at various stages during an example registration process, instigated by the selection of option 702. By registering, the user creates an account within the online-dating system 100, which is embodied in the database 108. In some implementations, different tiers of account (such as basic and premium) may be provided. In FIG. 8A, the user provides age information, by indicating an age bracket into which they fall via selection of one of a plurality of selectable options 802. In this example, the age brackets are defined somewhat qualitatively ("Early Teen", "Late Teen", "Early 20s" etc.), and the user does not have to provide an exact age. In FIG. 8B, the user indicates his or her gender, by selecting one of two selectable options 804 (male or female), however non-binary gender options could also be provided. FIGS. 8C-D illustrate one example of how a user can input a desired username, via a displayed text entry field 806. FIGS. 8E-8F show a slight variation, in which an indicator 808 is displayed as the user enters the text of his/her preferred username, to indicate whether or not the text inputted so far is available as a username. FIGS. 8G-I show how a user may enter a desired password, via input text field 810. An indicator 812 is displayed and updated to indicate a determined strength of the text inputted so far as a password. In some implementations, the user may be required to choose a password of sufficient strength before proceeding. In FIG. 8J, the user is presented with any terms and conditions for using the dating app service, which s/he must accept via option 814 before proceeding. The UI can switch between the configurations of FIGS. 8A-J in any suitable order as the user goes through the registration process. Of course, FIGS. 8A-JJ illustrate just one example of the type of information that might be collected during registration, and one example of how it might be collected via the dating app UI, and alternatives will be apparent.

Once users have registered in this manner, the pairing algorithm 504 executed at the back-end system 106 pairs registered users together, by creating associations between their identifiers in the database 108 (S4). Users can be paired together based on various criteria, such as location, gender, age, sexual orientation, self-declared interests and/or dating preferences, or other personal information etc. or any combination thereof. Location can for example be determined using the location sensor 216, for example based on satellite positioning (e.g. using GPS or other GNSS system), cellular triangulation etc., from the user device's IP address, or using any other form of positioning technique. Alternatively, it can be a self-declared location set by the user (possibly subject to verification).

In the described example, the pairing algorithm 504 is randomized in that users are paired based on random or pseudorandom inputs to the pairing algorithm 504. Although randomized, the pairing need not be "completely" random (in the sense that all users of the dating app need not have an equal chance of being paired)—certain pairings can be excluded based, for example, on the aforementioned pairing criteria, or the algorithm can be biased towards certain pairings based on those criteria etc.

In the following examples, it is assumed that users 103*a* and 103*b* in FIG. 1—"Alice" and "Bob" respectively—have been paired with each other in this manner.

Once two users have been paired, each of those users is provided with details of the other user. In particular, Bob's identity as embodied in the database 108 is rendered available to Alice's user device 102*a*, and Alice's identity as embodied in the database 108 is rendered available to Bob's user device 102*b*.

Figure 5:
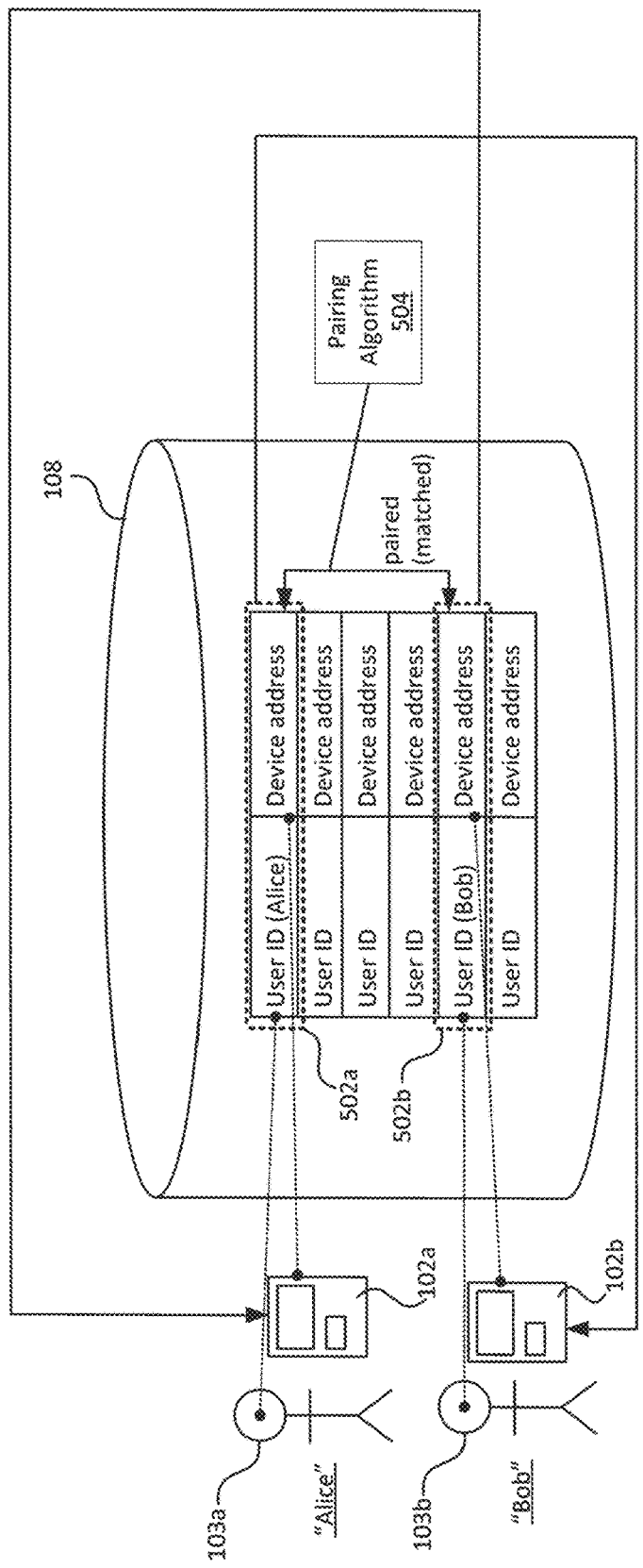
FIG. 5 shows a schematic illustration of how users of a dating app may be paired together (matched) by a pairing algorithm.

This is illustrated in the example of FIG. 5, which shows how, once Alice and Bob have been paired in the database 108, by the pairing algorithm 504, in response, Alice's identity 502*a*—comprising her username and device address in this example—is rendered available to Bob's device 104*b*, and likewise Bob's identity 502*b*—comprising his username and device address—is rendered available to Alice's device 104*a*.

Returning to FIG. 4, once Alice and Bob have been paired, they can instigate a real-time audiovisual (AV) conversation via their respective instances of the dating app 205*a*, 205*b* (S6). This is achieved by each of their devices 102*a*, 102*b* subscribing to the audio and video streams captured at the other device (the outgoing streams 322, 326 from the perspective of the device at which they are captured, and the incoming streams 324, 328 from the perspective of the device at which they are received). Either user can initiate the conversation as his/her device, via the UI rendered by the UI rendering component 310 of that device.

By way of example, FIG. 6 shows an example messaging flow for the conversation between Alice and Bob. The messages of FIG. 6 are control messages, transmitted and received by the control messaging components 312 at Alice and Bob's devices 102*a*, 102*b*.

In this example, Bob initiates the conversation by way of a user input 602 at his device 102*a*, which causes an invitation 604 to be transmitted to Alice's device 102*b*. Upon receiving the invitation 604, Alice can accept the invitation by way of a user input 606 at her device 102*b*, which causes an acceptance message 608 to be transmitted to Bob. With this message exchange complete, both devices 102*a*, 102*b* can now subscribe to each other's audio and video streams. As will be appreciated, this is just one example for the purposes of illustration, and more complex message exchanges can be performed to allow one of the users to initiate the conversation.

When the conversation has been initiated, audio streams are exchanged between Alice and Bob's devices 102*a*, 102*b* in both directions unhindered. Thus the users can speak to each other and hear what the other is saying similar to a conventional telephone call, but which is conducted via the dating app 205 itself.

In the present example, video streams are also exchanged between their devices 102*a*, 102*b* in both directions as soon as the conversation has been initiated. However, the video is suppressed in the sense that the visual content of both of the video streams are obscured by the respective video suppression components 311 at the user devices 102a, 102b. Where the video streams are capturing images of Alice and Bob's faces, the obfuscation is sufficient to conceal the user's faces. For example, it may be such that, whilst an outline of the faces is discernible (enough that each user can see he/she is talking to another person, and see some movement of the head), more detailed structure of the face is not, making it difficult or even impossible for the user's to identify each other visually.

Obscuring the video in this manner has the benefit of providing security for the users on the one hand, by ensuring their faces are concealed when in frame (which is important because, at this point, they are essentially strangers to each other), whilst on the other hand still providing a more engaging experience than a conversation conducted using audio alone.

For example, the video can be obscured by rendering a partially-transparent overlay on top of the incoming video stream, which is opaque enough to conceal the other user's face but transparent enough to allow the outline of the head to be discerned. Levels of opacity can be set as percentage alpha values (say at least 90%) or as floating point numbers between (0.0-1.0). This is just one example, and other forms of video obfuscation are equally viable. For example, another viable way of obscuring the video content is by applying a "filter" to the video stream to conceal the user's face. This could for example be a mask or other character illustration that tracks facial movements in the video stream to obscure the user's identity, including but not limited to: masquerades, cartoon characters, country flag silhouettes, national treasure personalities, celebrities or sponsored advertising branding. In some implementations, a user may be able to select their own filter to be applied to their video initially. As will be appreciated, there are various ways of processing video to obscure a user's identity by concealing his/her face, without disguising it altogether. The level of distortion that needs to be introduced to achieve this can vary depending on the type of processing, but the extent of the processing that is needed to keep the users' identities safe from their perspective will be apparent to the skilled person in any given context.

In the system of FIG. 3A, at each of Alice and Bob's devices 102a, 102b, the incoming video stream 328 from the other device is processed by the video suppression component 311 to obscure its visual content, once it has been received and decoded. That is, Alice's stream is obfuscated at Bob's device after transmission, by the video suppression component 311 at Bob's device, and vice versa. This processing is performed as part of the process of rendering the UI at that device, hence the video suppression component 311 is shown as a component of the UI rendering component 310 in FIG. 3A.

In the system of FIG. 3B, at each of the devices 102a, 102b, the outgoing video stream 326 is processed by the video suppression component 311 before encoding and transmission instead. That is, Alice's stream is obfuscated before transmission at Alice's device by the video suppression component 311 at that device, and Bob's stream is obfuscated before transmission at Bob's device by the video suppression component 311 at that device.

Note also that, in other implementations, it may be that the obfuscation is not performed at either device. For example, the video suppression components for each of the streams could be implemented at an intermediate relay node, such as a server, via which the streams are relayed.

Returning to FIG. 4, either one of Alice and Bob can initiate a request 612 to the other user to stop obscure the message (step S8, FIG. 4). In the example of FIG. 6, it happens to be Bob who initiates the request 612 to Alice's device, by way of a user input 610 at his device. However, it is equally viable for Alice to initiate the request to Bob's device instead. The user input 610 is provided during the communication event whilst the audio streams are being transmitted, received and outputted and the video streams are being transmitted, received and displayed in obscured form.

Therefore initiating the request 612 does not cause terminate video suppression for either user: once the request 612 has been sent, the system continues to suppress both Alice and Bob's video, and their faces therefore remain concealed. Rather, the system 100 will only stop suppressing the videos if both Alice and Bob agree to it.

Upon receiving the request 612, Alice's device 102b outputs a notification 614 of the request to Alice (step S10, FIG. 4) and Alice has the option of either accepting or refusing the request (S12).

If Alice accepts the request 612, in response, the video suppression components 311 at both user devices 102a, 102b stop obscuring both of the video streams (S14).

In the example of FIG. 6, Alice accepts the request 612 by way of a user input 616 at her device 102b, which causes an acceptance message 618 to be transmitted to Bob's device. At this point, both devices 102a, 102b know that Alice has accepted Bob's request. Again, this is just one example, and more complex message exchanges can be performed to agree to end video suppression, depending on the implementation. In any event, the respective video suppression components associated with each of the user devices 102a, 102b stop suppressing video for both of those devices 102a, 102b automatically in response to the same user input 616 at Alice's device 102a (as conveyed to Bob's device via message 618).

If Alice does not accept the request 612, but rejects or ignores it instead, the video suppression components continue obscuring both of the video streams (S16). That is, the video suppression components at both of the devices continue to suppress video for both users.

Preferably, each of the users is only permitted to send a limited number of such requests, up to a request threshold, for example a maximum of three requests to stop obscuring the video. Accordingly, if Bob attempts to send another such request, his control messaging component 312 determines whether he has reached the request threshold (S18). If not, a further request is instigated to Alice (S20); if so, no further request is sent because Bob is not permitted to send any more requests to Alice, at least at the current point in time (S22). Bob may be informed of this via the UI of his app. This may be an absolute limit, whereby Bob is never allowed to send another request to Alice, or it may be time limited, whereby earlier requests are discounted for the purposes of imposing this limit once an appropriate amount of time has elapsed, for example.

Each request may also have a limited time interval in which it can be accepted, after which it expires. Once Bob's request has expired, Alice can no longer accept it. However, she is free to send her own request to Bob, which he can accept if he chooses.

Either user can terminate a real-time conversation at any time. Moreover, after users have been paired, either user is free to "block" the other user should they wish to do so.

Once either user blocks the other user, it is no longer possible for either of those users to initiate a conversation with the other via the dating app.

Figure 6A:
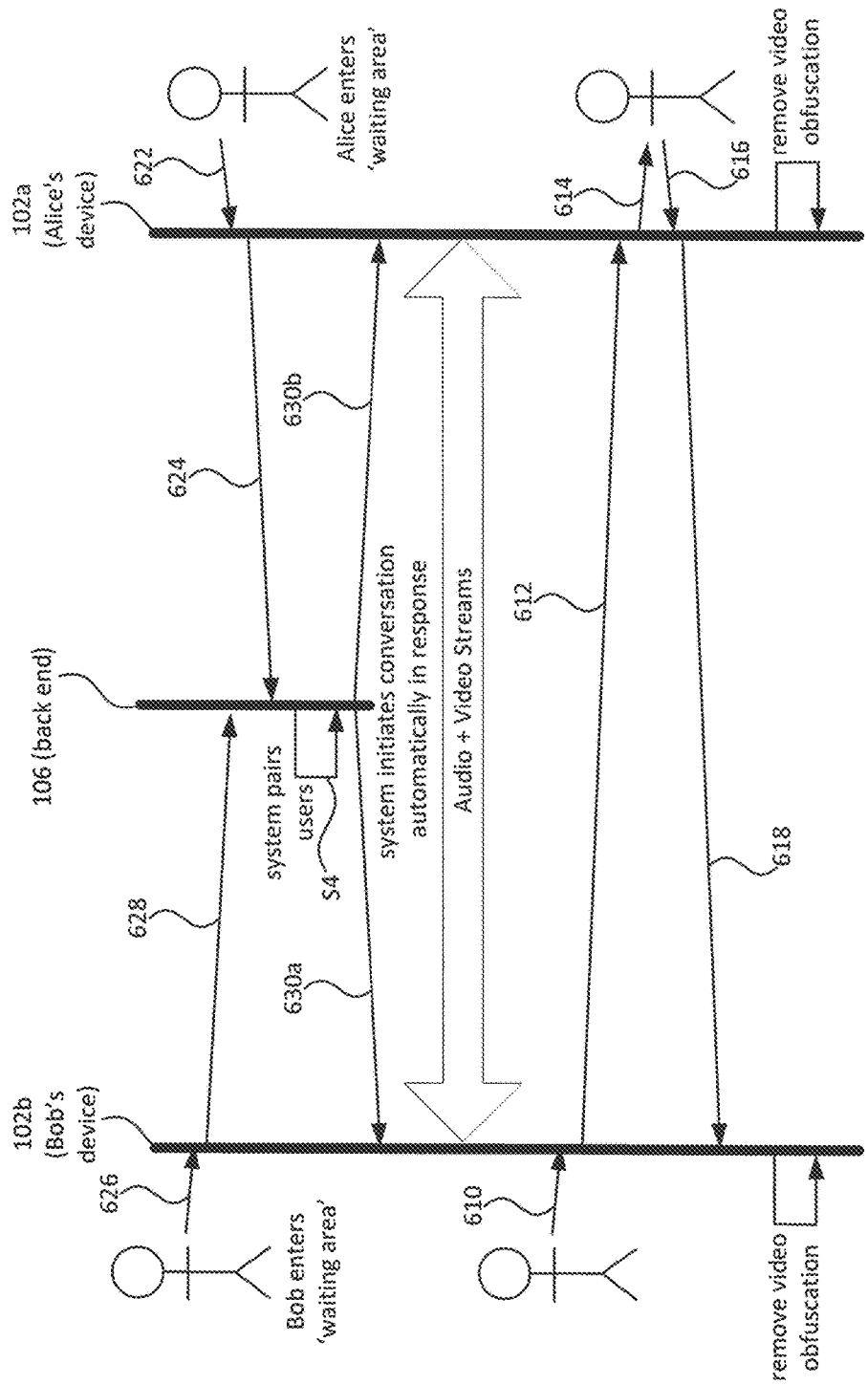
FIG. 6A shows another example messaging exchange for the method of FIG. 4.

FIG. 6A shows an alternative messaging exchange, in which the conversation between Alice and Bob is initiated in a different manner. In this example, the pairing algorithm 504 initiates the real-time conversation between Alice and Bob automatically, when they are first paired.

In this example, initially, Alice and Bob both enter a virtual "waiting area", by way of user inputs 622, 626 to their respective devices 102a, 102b. These inputs indicate that each user is currently ready to engage in a conversation, once the system has found them a match. The app can be configured such that users enter the waiting area as soon as they log in to the app, or this might be an active choice after they have logged in. When Alice and Bob enter the waiting area, the backend system 106 is informed by way of messages 624, 628 from Alice and Bob's devices 102a, 102b respectively. The back end system 106 pairs together users in the virtual waiting area and, in response to Alice and Bob being paired by the pairing algorithm 504 (corresponding to S4 in FIG. 4), the back-end system 106 automatically transmits communication event instigation messages 630a, 630b to Alice and Bob's devices 102a, 102b respectively, thereby instigating the communication event between Alice and Bob automatically, with video suppressed initially. That is, the exchange of audio and video streams between Alice and Bob's devices 102a, 102b is instigated automatically, in response to Alice and Bob being paired at step S4. Hereafter, the communication event proceeds in the same way as described above, and all description in relation to FIG. 6 applies equally to FIG. 6A in this respect; either one of Alice or Bob can request to stop suppressing video during the communication event, and video suppression terminates if and when both agree.

Figure 9A:
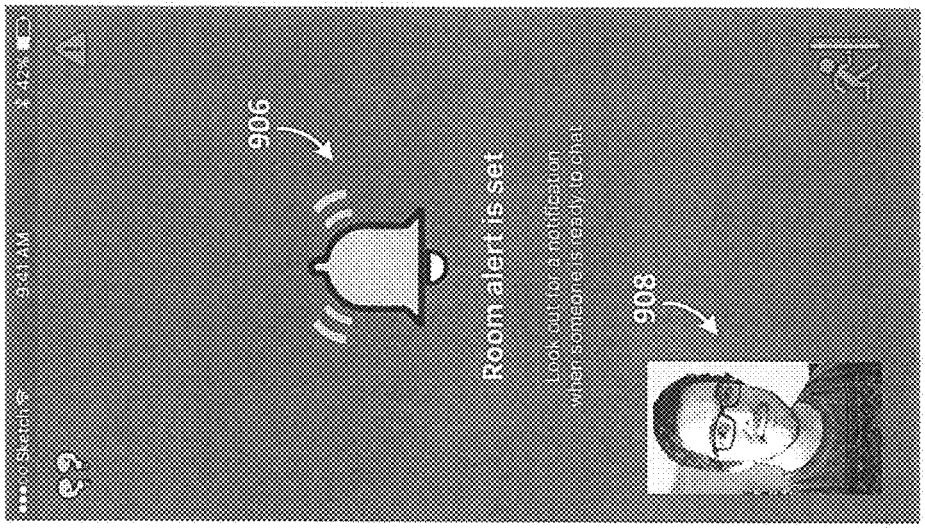
Figure 9B:
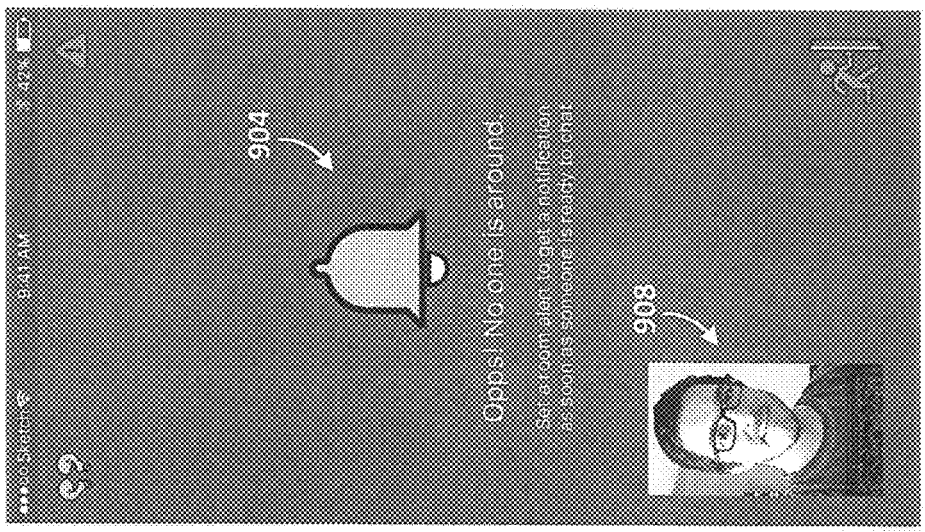
Figure 9C:
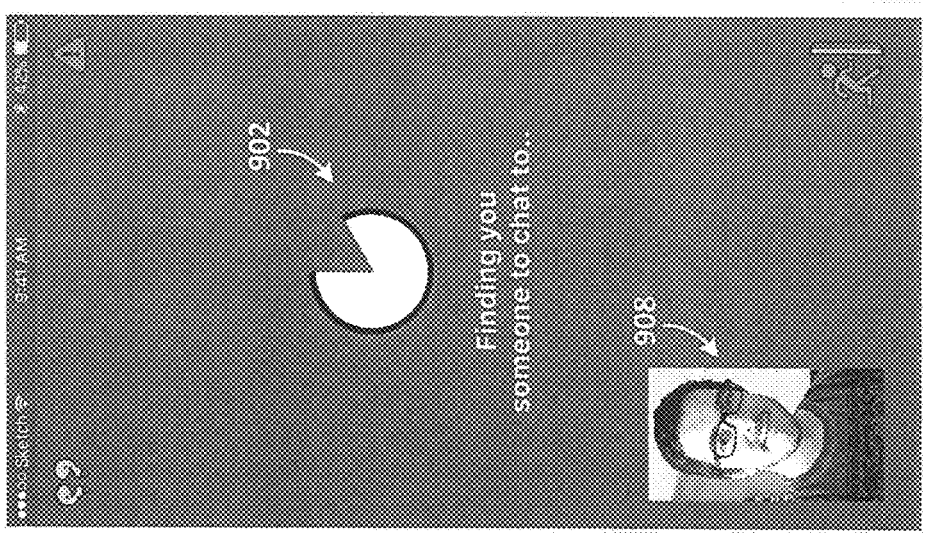

FIGS. 9A-C show example configurations of the dating App UI displayed to a user who in the waiting area—Bob's UI at this device 102b in this example. Initially, Bob is informed that they system is looking for another suitable user to pair him with (902, FIG. 9A). If the system cannot find another such user straight away (far-end user), Bob is informed of this via the UI (904, FIG. 9B) and he is provided with an option of activating a notification function via the UI to notify him when he is matched with another user. If Bob activates this function, the UI is updated to reflect this (906, FIG. 9C), and his device 102b will notify him if and when he is paired. During this time, a self-video image 908 is displayed. That is, Bob's own locally captured video data is displayed to him in a region of the UI, so that he can see what will be transmitted to the other user once paired (although this will of course be obscured at the far end device initially).

Figure 9D:
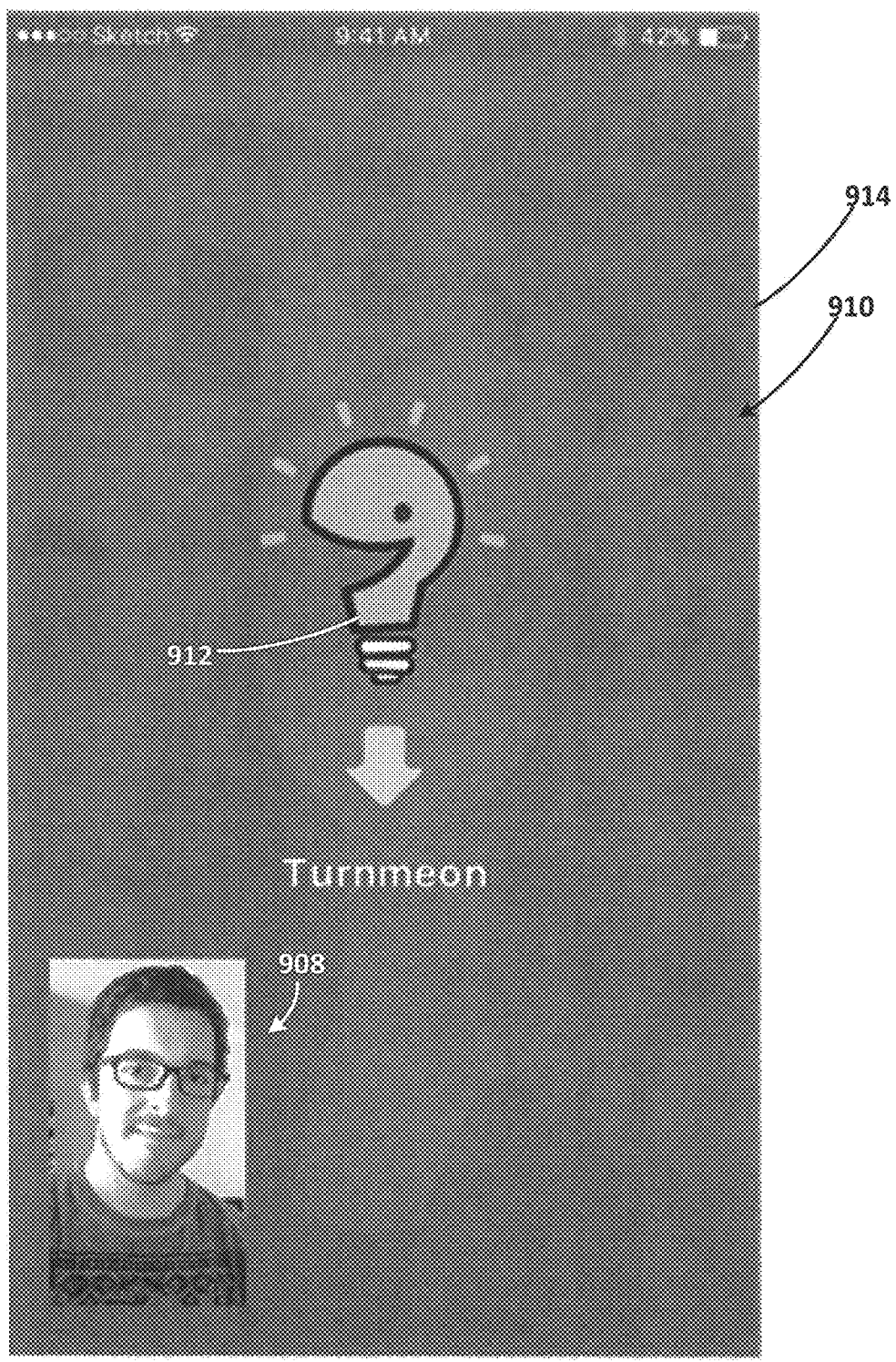

Once Bob is paired with Alice, in this example a conversation between Alice and Bob is instigated automatically in response as per FIG. 6A. At this point, audio and video data beings flowing in both directions between Alice and Bob, however, at each user's device, the video from the other user is obscured. An example of this is illustrated in FIG. 9D, in which Alice's video 910 (i.e. the far-end video form Bob's perspective) is obscured by a highly opaque but still slightly transparent overlay 914, which covers all or substantially all of the far-end video 910 such that the far-end video 910 is barely discernible to the near-end user. It is possible to make out the outline of Alice's head and hair, but her identity is obscured. A fully opaque graphic 912 is also displayed at or near the centre of Alice's video, to further obscure the region where her face is likely to be. Bob's self-video 908 is still displayed via his UI unobscured, so that he can clearly see what is being transmitted to Alice's device.

Figure 9E:
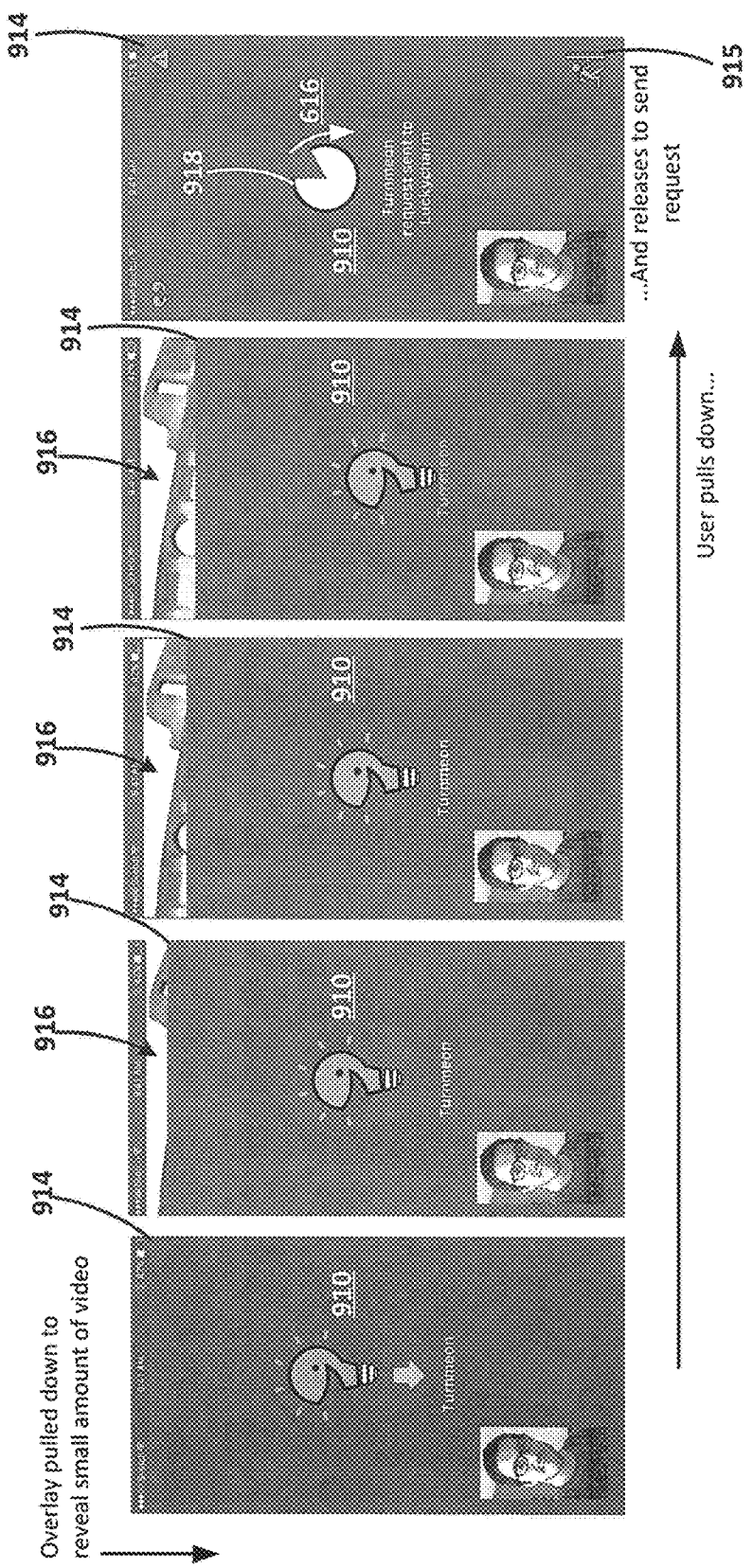

FIG. 9E shows one example of how the UI can change as Bob initiates the request 612 for full, unobscured video. In this example, the user input 610 that initiates the request 612 is a "drag and release" gesture on the touchscreen of Bob's user device 102b, whereby Bob brings a finger (e.g. thumb) into contact with the touchscreen at an initial point on the touchscreen, drags it along the touchscreen to another point sufficiently far away from the initial point, and then releases it. In this example, the gesture is performed by dragging vertically downwards, but in other implementations it could be in any desired direction or directions.

As can be seen, as Bob performs the gesture the overlay 914 moves to match the direction of the gesture, so as to reveal a small area 916 of the far-end video 910 without obfuscation ("preview area"). The size of this preview area 916 increases, up to a maximum size, as Bob drags further along the touchscreen. The maximum size of the preview area 916 is set such that, overall, the video remains obscured (such that the far end-user's face remains concealed) even when this maximum size is reached, and the size of the preview area 916 cannot be increased beyond this maximum size. In the example of FIG. 9E, the maximum extent of the preview area in the direction in which its size increases (height in this example) is around 10-20% of the overall extent of the far-end video in that direction (the height of the video in this example). That is, the overlay moves by at most 10-20% of the extent of Alice's video in the direction of movement.

This has the benefit of conveying, to Bob, information about the gesture he is performing via intuitive visual feedback: as he drags, a small amount of video is de-obfuscated, thereby conveying to Bob that the gesture he is making relates to the de-obfuscation of the video. That is, Bob can in effect see what it is he is requesting from Alice, namely removal of the overlay 914, which he himself is only able to remove to a very limited extent (i.e. only up to the maximum size of the preview area 916).

As Bob's thumb/finger is released, the request 912 is sent in response and the overlay 914 returns to its initial position so that the far-end video 910 is fully obscured again. A notification 918 is displayed to Bob via his UI to confirm that the request 612 has been sent.

This is one example of how a level of obfuscation applied to Alice's video can be reduced slightly as Bob performs the gesture, before the request to remove obfuscation altogether has been accepted. Other examples include reducing the opacity of the overlay (to a lower but still non-zero value, such that the video is still obscured until the request is granted), or where facial filters are used for obfuscation, by adapting at least one facial distortion parameter of the filter to reduce an amount of facial distortion created by the filter. These have the same benefits in terms of providing intuitive visual feedback.

The level of obfuscation L, where L may for example be the height of the preview area 918 or the opacity of the overlay, change as a function of the distance D the user has dragged along the screen. This may not be a linear function, such that t. For example, as the distance increases, the "rate" of obfuscation—that is, dL/dD (the differential of the obfuscation level L with respect to the distance D)—may decrease with the distance D. That is, such that with each incremental increase in the distance D, the obfuscation level decreases by a smaller amount as the distance D increases overall. This gives a sense of greater "tension" as the user drags further.

The device may also provide haptic feedback as the user performs the gesture, for example using an internal vibration mechanism of the user device. This could for example be a case of actuating the vibration mechanism at predetermined points as the gesture is performed (e.g. at predetermined percentages of the maximum distance the overlay can be moved etc.), or a level of vibration could be increased as the gesture is performed. More generally, the level of vibration could depend on, say, a duration, speed or distance relating to the performance of the gesture, or any combination thereof.

FIG. 9F shows the UI of Alice's device 102a, and in particular shows an example of how the notification 614 is outputted at the far end device. In this example, the notification is a dynamic notification, which changes gradually to show how long the Alice has left to accept the notification by "counting down" clockwise, as denoted by arrow 616 in FIG. 9F. At this point, Bob's video 618 is still displayed at Alice's device in an obscured form, by an equivalent overlay 620 of her UI.

As shown in the final picture of FIG. 9E, Bob's notification 616 updates to match Alice's notification 616, so that Bob also knows how long Alice has to accept the request. That is, Bob's notification 616 also counts down the time remaining.

As shown in FIG. 9G, if Alice accepts the request 612 before it expires, the overlay 620 is removed from her UI in response and Alice can therefore see Bob's video 618 unobscured. The overlay 914 of Bob's UI is also removed from Alice's video 910 in response to Alice's acceptance, therefore Bob can also see Alice's video unobscured. This is not shown in the Figures, however all description pertaining to Alice's overlay 620 on Bob's video 618 applies equally to Bob's overlay 914 on Alice's video 910.

At this point, Alice and Bob can now engage in full face-to-face conversation, without concealment.

The user input 616 made by Alice to accept the request 612 may also be a gesture. This could for example be a simple swipe right (say) to reject, and a swipe left to accept. As another example, in order to respond to the gesture, Alice may first drag down on the touchscreen and, having dragged down, then swipe right to reject or left to accept (tracing a reverse "L" shape). This can be an unbroken gesture, where Alice has to maintain contact with the touchscreen throughout (i.e. tracing an "L" shape or a reverse "L" shape on the touchscreen). Alternatively, after dragging down, she may be able to lift her finger off the touchscreen and return to it subsequently to complete the gesture (effectively swiping down first, and then swiping left or right).

Either user can terminate the conversation at any time, by selecting a displayed termination option (labelled 915 for Alice and 917 for Bob; note Bob's option is not visible in all of the Figures, but may nevertheless be displayed throughout).

Figure 10B:
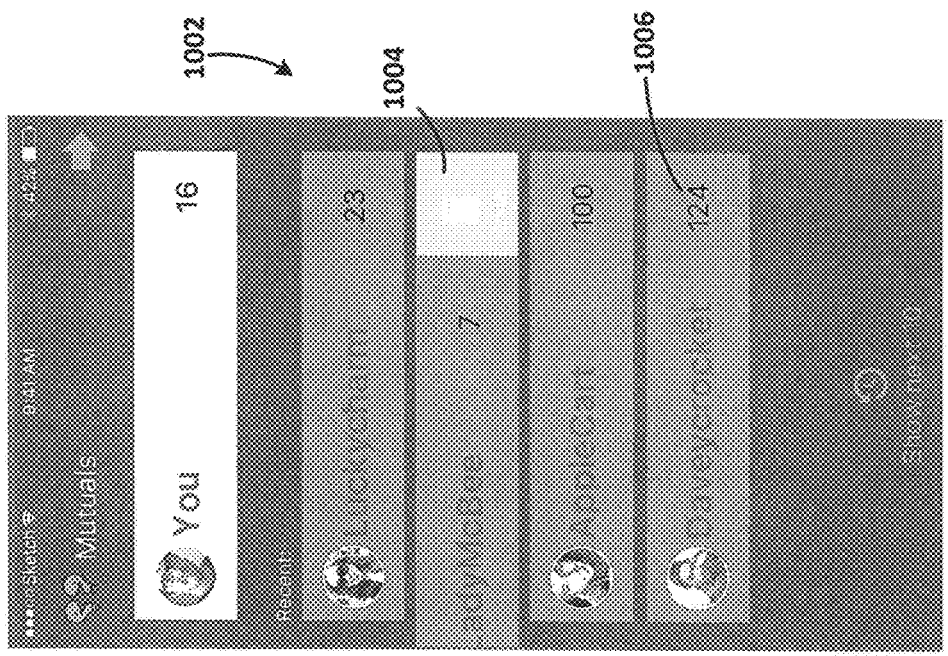
FIGS. 10A-10B show how a user's matches may be presented via the UI.
Figure 10A:
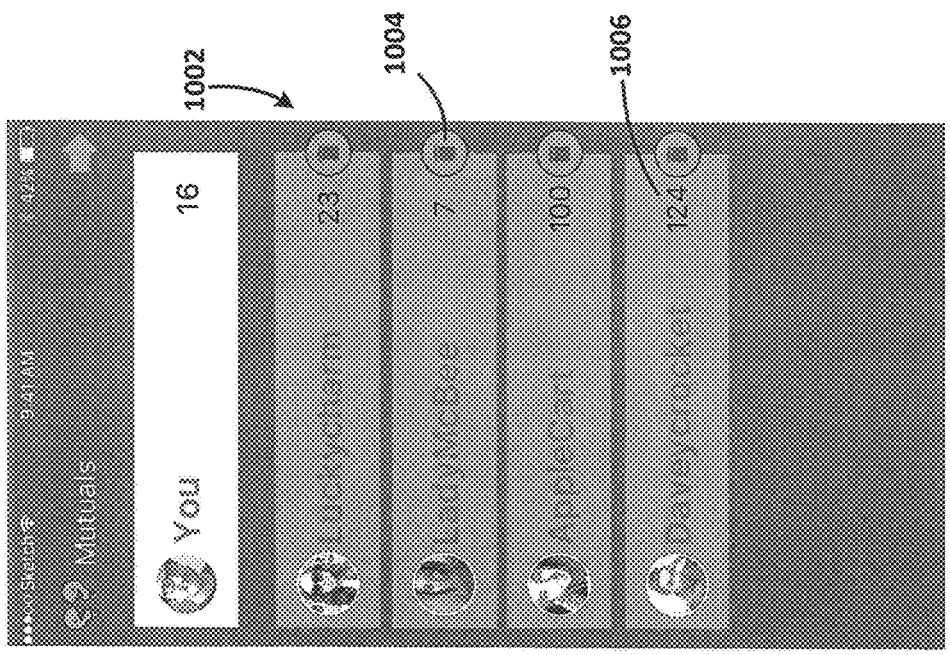

FIGS. 10A and 10B illustrate how a user can obtain a list 1002 of his/her matches via the dating app UI at his/her user device. That is, a set of user identities for users s/he has been paired with. This may be all users s/he has been paired with, or it may only be users for whom the restrictions on video have been lifted by mutual agreement. For each of the users in the list 1002, a selectable option 1004 may be provided to "delete" (i.e. block) that user. This can be a selectable option that is always displayed (as in FIG. 10A), or one that is revealed by way of a swipe gesture (FIG. 10B).

Engagement Scores:

To encourage repeat traffic, reward users for staying engaged with the app, and provide user quality validation to other users, a points reward system is implemented within the on-line dating system.

Over time users come to expect honesty and integrity in the other users they are meeting—something that is somewhat lacking in existing dating apps that are available today (e.g. in existing dating app's, users profile images are often out of date or are not even images of the actual user in question. This is one of the problems with uploaded images, as opposed to video images that are taken by a camera in real time).

Based on engagement statistics features are unlocked via a points algorithm (engagement algorithm), which awards points to users based on the volume of agreed chats and the number of agreed removals of obfuscation. The engagement algorithm can for example be executed at the back-end 106 as shown in FIG. 1, in which the engagement algorithm is labelled 514.

The total number of points awarded to a user constitutes an "engagement score" for the user in question, which can be stored in the database 108 as part of that user's profile and updated as the user engages with the app.

As users gain points, features of the online-dating system/app are "unlocked" as they reach certain engagement thresholds. That is, after a certain amount of generated points users may receive an "achievement".

By way of example, when a user's engagement score reaches a first engagement threshold, an avatar camera creation tool may be unlocked in response, to render use of that tool available to the user. The tool cannot be used until this threshold is met. The tools allows the user to create an avatar using the same camera on the device as the video chat mechanism.

These upgraded users now enter "discovery mode", by unlocking a discovery function of the app, with avatars visible to other users where appropriate and could be indexable via a search mechanism when other engagement achievements are met. That is, the avatar is visible to other users of the system who have also reached the first engagement threshold, and can for example be stored in the database 108 as part of the user's profile/account.

Users who have reached discovery mode may be able to instigate communication events with other users who have also reached the discovery mode, without having to be matched by the pairing algorithm 504 first. For example, discoverable users may be listed on a "leader board" style interface, ordered according to their scores, wherein the leader board interface is available to other discoverable users. Discoverable users can instigate communication events with other discoverable users on the leader board, without having to be matched first.

Users who have entered the discovery mode can be marked as discoverable in the database 108, for example by setting a discovery flag that is part of their profile in the database 108.

Expanding on these principles, points are awarded to users of the dating app as a "reward" for engaging with the app, and in particular as a reward for engaging with other users of the app. For example, points may be awarded to users in dependence on their willingness to remove video obfuscation during conversations with other users. By way of example, figures 10A and 10B indicate, for each of the listed users, the total number of points awarded to that user, labelled 1006 for the final user in the list by way of example.

For example, the engagement score can be incremented when a user accepts a request 612 to de-obfuscate video. The amount by which it is incremented may depend on how quickly the user accepts the request 612, whereby the user can achieve a greater increment by accepting the request in a shorter amount of time. This can for example be determined as a proportion of the time that is remaining to accept the request, or some other function of the remaining time. The engagement score could also be incremented for the user who sends the request, though this may be contingent on the other user accepting the request. In the context of the online-dating system 100, the engagement score can be seen as a form of "social ranking", set according to the willingness of users to engage with other users of the app.

Users' interaction scores can be used by the pairing algorithm 504 as a criterion for pairing users. For example, users with similar engagement scores might be more likely to be paired together. As another example, users with higher engagement scores may be paired with other users more frequently than users with lower engagement scores, i.e. so that users with higher engagement scores get matched more often, to encourage engagement. That is, the pairing algorithm may be configured such that users with higher engagement scores have a greater likelihood of being paired with other users. This provides users with a motivation to engage with the app, in order to improve their matching chances.

Other mechanisms could also be provided by which a user can influence their matches, for example via premium accounts.

Gesture Inputs

With regards to the dating app UI, to create a streamlined but intuitive interface that makes optimal use of the limited available display space on mobile devices, a number of actions can be triggered by touchscreen gestures in addition to those described above. This will now be described with reference to FIGS. 11A-M. It is noted that each of these gesture-action pairings can be implemented individually or in any combination in generating a user interface.

In order to trigger an action during a conversation with another user (or potentially at other times as well, such as in the virtual waiting area), the user can press, touch and hold, tap or double tap, or multi-touch on any number of fingers, as shown in FIG. 11A. Having done this the user can pull/drag in any direction to causes one or more icons 1102 ("call to action") to be displayed, each representing a different action that can be triggered. The icons may move from an off-screen location to an-onscreen location as the user pulls down, to provide an intuitive interface whereby the user "drags" the icons onto the display. These may be actions that interface with the device hardware or other application features including but not limited to: toggling lens apertures, toggling camera lamp where available, capturing a still image, toggling recording modes, toggling mute audio or triggering application menu systems. Having pulled down as in FIG. 11B, from there the user can move in a direction to prime a call to action and highlight its potential activity (to the left, right and centre in the examples of FIGS. 11C, 11D and 11E respectively). A user can reverse (cancel) the initial pull/drag direction essentially resetting the visibility of any call to action icons and un-priming any selected call to actions, as shown in FIG. 11F. Alternatively, the user can release his finger or fingers from the screen trigger the currently selected action (FIG. 11G). At this point, the action icons are removed from the available screen real estate until is invoked again as in FIG. 11A.

Note that the pull-down gesture of FIG. 11B may be the same gesture that is made to send the request 612. In this context, at the start of a communication event, when video is being obscured, the pull-down gesture will cause a request for de-obfuscation to be sent. Once such a request has been accepted so that video is no longer obscured, further performance of the pull-down gesture will instead pull-down the call to actions 1102 as in FIG. 11B. In this example, the call to actions 1102 all relate to the capturing of video, and are therefore only really applicable when video is no longer obscured. Thus the pull-down gesture is "re-purposed" in a logical manner once the request has been accepted, whereby once the request has been accepted this gesture now opens-up options that have become relevant now that the request has been accepted and full, unobscured video is being shown for both users.

FIG. 11H: During a conversation with another user, the video stream received from the other user is rendered as a receiving video object, which is full screen but not limited to position, size or shape. The user's self-video is rendered as a preview video object whish not limited to position, size or shape. This is overlaid on the receiving video object in a limited area of the display.

FIG. 11I: As noted, to send a request 612, the of request 612 can pulldown to a certain point and release to send a request to the receiver to initiate removal of video obfuscation; with audio available to both parties at all times, Internet connections are maintained throughout. That is, the request is made when the users are already connected and exchanging audio streams.

FIG. 11J: Within an allotted time frame, the receiver swipes left to cancel/ignore the request to share video, which results in keeping all video obfuscation enabled for both parties and notifies the initializer of the request the receiver's response status message.

FIG. 11K: Within the allotted time frame, receiver swipes right to agree the request to share video, which results in removing all video obfuscation (for both parties) and notifies the initializer of the request.

FIG. 11L: Dragging your own preview up switches to the back camera when obfuscation is removed as long as the new preview position is greater than more than half the full screen height. That is, a user can switch from the front facing camera to rear facing camera by moving their own self-video image at least a predetermined distance, possibly in a certain direction. Dragging the preview object in the same manner again switches back to the front camera. In alternative implementations, movement of the preview object could trigger other camera-related function, such as activating or deactivating an illumination device associated with an active camera to illuminate its field of view.

Figure 11M:
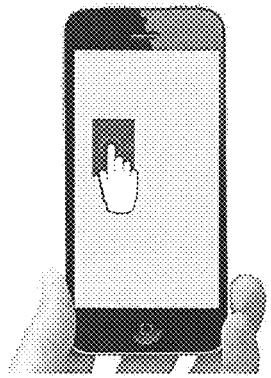

FIG. 11M: Where applicable, press, touch and hold, tap or double tap, multi-touch of any number of fingers on the preview object will toggle the camera light.

Returning to FIGS. 3A/B, it is noted that each of the functional components referred to above represents part of the functionality of the relevant media exchange system 300a/300b. In the above examples, the media exchange systems 300a, 300b represent functionality implemented by executable instructions (software), when executed on the processor 202. That is, each of the functional components represents a different part of the functionality of that software when executed. In the described examples, these are specifically instructions of the dating app 205. That is, each of the media exchange systems 300a, 300b represents functionality of the dating app 205. Alternatively, at least some of this functionality could be implemented, under the control of the dating app 250, by software outside of the dating app 205. For example, some or all of the encoding/decoding operations could be performed by an operating system (OS) of the user device 102, under the control of the dating app 205 (that is, the dating app 205 could harness native functionality of the OS to provide the functions described herein). Alternatively, part of this functionality could even be implemented in dedicated hardware of the device 102, for example certain user devices have hardware audio/video encoding/decoding circuitry which could be used under the control of the dating app 205. The term "component" is generally used to mean software, hardware or any combination thereof that is configured to implement particular functionality. It is noted that the various inputs/outputs shown in FIGS. 3A/3B generally represent high-level interactions between the various functional components, and need no necessarily correspond to any particular configuration of physical or logical connections.

It is also noted that, whilst in the above, video is suppressed for both user by obscuring the visual content of their video streams, video could also be suppressed by not displaying video for those users at all. For example, an avatar image (static or animated) may be displayed for each user instead, which is replaced with their video stream once suppression stops.

Moreover, whilst the above has been described in the content of on-line dating, the invention can also be applied in other contexts, such as social media. In this case, real-time conversations in accordance with the invention can, for example, be initiated between users who are friends on a social media platforms. Randomized pairing might also be implemented in a social media context. In this context, the application 205 may be referred to as a social media app.

Moreover, whilst the above has been described in relation to a communication event between only two users, a communication event can also take place between more than two users in a group conversation context. Accordingly, references to "a communication event between a requesting and a responding user" (or similar) do not exclude the possibility of more than two users participating in the communication event. For example, a virtual "hotel lobby" environment may be provided in which users can mingle. An option may be provided for those users to enter private conversations in groups of two or more, should they wish to do so.

Moreover, whilst in at least some of the above-described embodiments, the same level of obfuscation is applied for all users (e.g. overlay with 90% opacity), alternatively different levels of obfuscation could be applied for different users. This can be a user setting, e.g. a user could specify the opacity level to be applied to his/her video. As another example, the amount of obfuscation that is applied to a user's video could be set in dependence on his/her engagement score, e.g. a greater level of obfuscation (e.g. more opaque overlay) could be applied for users with higher engagement scores, to make more "popular" users more "elusive".

The gesture control of the present invention has been described above in relation to dating services where people meet random people on the fly and need to protect their identity until a bond of trust is formed vocally first. However, it can also be implemented in a variety of other contexts. In particular, the "pulldown to request unobscured video" can be used in any context in which selective obfuscation of visual content, such as the visual content (moving image) of a video stream, is desired.

Benefits include, for example, enforcing intellectual property rights (copyright in particular), unique selling points for B2B (business-to-business) and B2C (business-to-consumer) application ideas. It is envisaged that this has the potential to become a defacto UX way to show and hide a video stream whilst in communication with another user and/or in broadcasting or other video streaming situations, such as video on demand or live streaming. This applies to the mobile space in particular, and is envisaged in the context of many different mobile apps such as Facebook, Google, Tinder, Zoosk, SnapChat, Twitter, WhatsApp, Instagram et al.

It will be appreciated that the above embodiments have been described only by way of example. Other variations and applications of the present invention will be apparent to the person skilled in the art in view of the teaching presented herein. The present invention is not limited by the described embodiments, but only by the accompanying claims.

What is claimed is:

1. A method of effecting a communication event via a network between a requesting user, operating a first user device, and a responding user, operating a second user device, the method comprising:
   initiating the communication event, in which each of the user devices captures a stream of audio data, transmits the captured stream of audio data to the other user device via the network for receiving thereat, and outputs, to its user, the audio stream received from the other user device;
   wherein a video exchange function is initially suppressed for the communication event for both of the user devices, by first and second video suppression components associated with the first and second user devices respectively, and the first user device transmits to the second user device, in response to a user input from the requesting user, a request to stop suppressing video for the communication event; and
   wherein if the responding user does not accept the request, both of the video suppression components continue suppressing the video exchange function for both of the user devices, wherein if the responding user accepts the request, both of the video suppression components stop suppressing the video exchange function for both of the user devices in response, wherein each of the user devices implements the video exchange function by capturing a stream of video data, transmitting the captured stream of video data to the other user device via the network for receiving thereat, and displaying, to its user, the stream of video data received from the other user device, and wherein each of the user devices also capture, transmit and display the video streams when the video exchange function is suppressed, and each of the video suppression components suppresses the video exchange function for its associated user device by processing the stream of video data captured at that user device to obscure its visual content.

2. A method according to claim 1, wherein the user input is a gesture on a touchscreen of the first user device.

3. A method according to claim 2, wherein the gesture is a drag and release gesture.

4. A method according to claim 1, wherein the user input is a drag and release gesture on a touchscreen of the first user device wherein as the user performs the drag and release gesture by dragging along the touchscreen of the first user device, a level of obfuscation applied to the video stream received at the first user device from the second user device is reduced in response, before the request has been accepted, whereby the visual content remains obscured but with a lower level of obfuscation.

5. A method according to claim 1, wherein the visual content is obscured by processing the stream of video data such that a partially transparent overlay is rendered on the stream of video data when displayed.

6. A method according to claim 4, wherein the visual content is obscured by processing the stream of video data such that a partially transparent overlay is rendered on the stream of video data when displayed, wherein as the user performs the drag and release gesture by dragging along the touchscreen of the first user device, in response an opacity of the overlay is reduced from an initial non-zero value to a new non-zero value, thereby reducing the level of obfuscation.

7. A method according to claim 1, wherein the visual content is obscured by applying a face-concealing filter to the stream of video data.

8. A method according to claim 4, wherein the visual content is obscured by applying a face-concealing filter to the stream of video data, wherein the level of obfuscation is reduced by adapting at least one parameter of the face-concealing filter, to reduce an extent to which a face in the visual content is concealed.

9. A method according to claim 1, wherein the responding user accepts the request by making a first gesture on a touchscreen of the second user device, and rejects the request by making a second gesture on the touchscreen of the second user device.

10. A method according to claim 9, wherein the first and second gestures are both instigated by a drag action on the touchscreen of the second device in an initial direction, wherein the first gesture is completed by a subsequent drag and release action in one of the directions perpendicular to the initial direction, and the second gesture is completed by a subsequent drag and release action in the other direction perpendicular to the initial direction; or
wherein the first gesture is a swipe in a first direction and the second gesture is a swipe in an opposing direction.

11. A method according to claim 1, wherein each of the users has an associated identifier held in a database, wherein the identifiers are paired with each other in the database allow the communication event between the users to be initiated.

12. A method according to claim 11, wherein in response to the identifiers being paired, each of the paired identifiers is rendered available to the user device operated by the other user.

13. A method according to claim 11, wherein the user identifiers in the database are paired with each other using a pairing algorithm.

14. A method according to claim 13, wherein the user identifiers in the database are paired with each other, by the pairing algorithm, based on one or more of the following pairing criteria: age, gender, location, friendship preferences, dating preferences, interests, and sexual orientation.

15. A method according to claim 13, wherein the pairing algorithm is a randomized pairing algorithm.

16. A method according to claim 13, wherein, for each of the users, at least one engagement score for that user is held in the database in association with that user's identifier, wherein the user identifiers in the database are paired with each other, by the pairing algorithm, based on their associated engagement scores.

17. A method according to claim 1, wherein the communication event is conducted via respective applications executed on the user devices, wherein for each of the users, at least one engagement score for that user is held in a database in association an identifier associated with that user, which is increased as that user engages with the application executed on his or her user device, wherein in response to a user's engagement score reaching an engagement threshold, a function of the application is unlocked for that user in response.

18. A method according to claim 17, wherein the application function is a discovery function which, when unlocked for a user, allows that user to obtain information held in the database about other users for whom the discovery function has also been unlocked;
wherein the communication event between the requesting and responding users is initiated by one of those users after the discovery function has been unlocked for both of those users, using information about the other user obtained from the database via the discovery function by the user initiating the communication event.

19. A method according to claim 16, wherein if the responding user accepts the request, the responding user's engagement score is incremented in response.

20. A method according to claim 1, wherein the number of requests to stop suppressing video that the requesting user can instigate to the responding user is limited by a request threshold.

21. A method according to claim 1, wherein if the request is not accepted by the responding user within a time limit, it cannot be accepted thereafter.

22. A method according to claim 21, wherein the second user device displays a notification of the request to the responding user, wherein the notification is updated dynamically to convey an amount of time remaining to accept the request.

23. A method according to claim 1, wherein the video exchange function is suppressed for each of the user devices by preventing the capturing, receiving or displaying of video data at that user device, whereby no video data of the communication event is displayed at either of the user devices when the video exchange function is suppressed.

24. A computer program product comprising executable instructions stored on a computer-readable storage medium, which are configured, when executed, to carry out the following steps, in order to effect a communication event via a network between a requesting user, operating a first user device, and a responding user, operating a second user device:
initiating the communication event, in which each of the user devices captures a stream of audio data, transmits the captured stream of audio data to the other user device via the network for receiving thereat, and outputs, to its user, the audio stream received from the other user device;
wherein a video exchange function is initially suppressed for the communication event for both of the user devices, by first and second video suppression components associated with the first and second user devices respectively, and the first user device transmits to the second user device, in response to a user input from the requesting user, a request to stop suppressing video for the communication event; and
wherein if the responding user does not accept the request, both of the video suppression components continue suppressing the video exchange function for both of the user devices, wherein if the responding user accepts the request, both of the video suppression components stop suppressing the video exchange function for both of the user devices in response, wherein each of the user devices implements the video exchange function by capturing a stream of video data, transmitting the captured stream of video data to the other user device via the network for receiving thereat, and displaying, to its user, the stream of video data received from the other user device, and wherein each of the user devices also capture, transmit and display the video streams when the video exchange function is suppressed, and each of the video suppression components suppresses the video exchange function for its associated user device by processing the stream of video data captured at that user device to obscure its visual content.

25. A computer system comprising:

at least one processor; and electronic storage coupled to the at least one processor configured to hold executable instructions, which are configured, when executed on the at least one processor, to carry out the following steps, to effect a communication event via a network between a requesting user, operating a first user device, and a responding user, operating a second user device:

initiating the communication event, in which each of the user devices captures a stream of audio data, transmits the captured stream of audio data to the other user device via the network for receiving thereat, and outputs, to its user, the audio stream received from the other user device;

wherein a video exchange function is initially suppressed for the communication event for both of the user devices, by first and second video suppression components associated with the first and second user devices respectively, and the first user device transmits to the second user device, in response to a user input from the requesting user, a request to stop suppressing video for the communication event; and wherein if the responding user does not accept the request, both of the video suppression components continue suppressing the video exchange function for both of the user devices, wherein if the responding user accepts the request, both of the video suppression components stop suppressing the video exchange function for both of the user devices in response, wherein each of the user devices implements the video exchange function by capturing a stream of video data, transmitting the captured stream of video data to the other user device via the network for receiving thereat, and displaying, to its user, the stream of video data received from the other user device, and wherein each of the user devices also capture, transmit and display the video streams when the video exchange function is suppressed, and each of the video suppression components suppresses the video exchange function for its associated user device by processing the stream of video data captured at that user device to obscure its visual content.

* * * * *